US012517353B2

(12) United States Patent
Choi et al.

(10) Patent No.: US 12,517,353 B2
(45) Date of Patent: Jan. 6, 2026

(54) HEAD-UP DISPLAY FOR VEHICLE

(71) Applicant: LG Electronics Inc., Seoul (KR)

(72) Inventors: Sunghwan Choi, Seoul (KR);
Dukyung Jung, Seoul (KR); Ilwan Kim, Seoul (KR); Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/951,590

(22) Filed: Sep. 23, 2022

(65) Prior Publication Data

US 2023/0016174 A1 Jan. 19, 2023

Related U.S. Application Data

(63) Continuation of application No. 16/793,397, filed on Feb. 18, 2020, now Pat. No. 11,526,005, which is a
(Continued)

(30) Foreign Application Priority Data

Dec. 2, 2016 (KR) .................. 10-2016-0163753

(51) Int. Cl.
*G02B 27/01* (2006.01)
*G02B 27/00* (2006.01)
*G06T 19/00* (2011.01)

(52) U.S. Cl.
CPC ..... *G02B 27/0101* (2013.01); *G02B 27/0179* (2013.01); *G06T 19/006* (2013.01);
(Continued)

(58) Field of Classification Search
None
See application file for complete search history.

(56) References Cited

U.S. PATENT DOCUMENTS

2010/0253493 A1  10/2010  Szczerba et al.
2012/0050139 A1*  3/2012  Wang ............... G02B 27/0179
                                                          345/7
(Continued)

FOREIGN PATENT DOCUMENTS

CN       105150935       12/2015
JP       2008151992       7/2008
(Continued)

OTHER PUBLICATIONS

Extended European Search Report in European Application No. 17875849.6, dated Sep. 10, 2020, 10 pages.
(Continued)

*Primary Examiner* — Christopher R Lamb
(74) *Attorney, Agent, or Firm* — Fish & Richardson P.C.

(57) ABSTRACT

A head-up display for a vehicle is configured to change display positions of a plurality of virtual images displayed through a windshield of the vehicle or the like to implement augmented reality by a control method. The head-up display includes a mirror unit including a first mirror for reflecting first and second image lights toward a windshield of the vehicle, a display layer located at the windshield of the vehicle to display a first virtual image corresponding to the first image light in a first region, and display a second virtual image corresponding to the second image light in a second region, and a controller configured to change an inclination of the first mirror to change a display position of the first and the second virtual image.

11 Claims, 34 Drawing Sheets

Related U.S. Application Data continuation of application No. 15/663,261, filed on Jul. 28, 2017, now Pat. No. 10,606,075.

(52) U.S. Cl.
CPC .. *G02B 27/0093* (2013.01); *G02B 2027/0118* (2013.01); *G02B 2027/0127* (2013.01); *G02B 2027/014* (2013.01); *G02B 2027/0181* (2013.01); *G02B 2027/0183* (2013.01)

(56) References Cited

U.S. PATENT DOCUMENTS

| | | | | |
|---|---|---|---|---|
| 2013/0265646 | A1* | 10/2013 | Sakai | G02B 27/01 359/630 |
| 2014/0247262 | A1 | 9/2014 | Hugues | |
| 2014/0362195 | A1 | 12/2014 | Ng-Thow-Hing | |
| 2016/0167514 | A1 | 6/2016 | Nishizaki et al. | |
| 2016/0202482 | A1 | 7/2016 | Kuzuhara et al. | |
| 2016/0216521 | A1 | 7/2016 | Yachida | |
| 2016/0313562 | A1 | 10/2016 | Saisho | |
| 2016/0349066 | A1 | 12/2016 | Chung et al. | |
| 2017/0146803 | A1 | 5/2017 | Kishigami et al. | |
| 2017/0235139 | A1 | 8/2017 | Niu et al. | |

FOREIGN PATENT DOCUMENTS

| | | |
|---|---|---|
| JP | 2009015128 | 1/2009 |
| JP | 2012006469 | 1/2012 |
| JP | 5145710 | 2/2013 |
| JP | 2013047021 | 3/2013 |
| JP | 2013056633 | 3/2013 |
| JP | 2015101311 | 6/2015 |
| JP | 2016045252 | 4/2016 |
| JP | 2016053690 | 4/2016 |
| JP | 2016060445 | 4/2016 |
| JP | 2016-068693 | 5/2016 |
| WO | WO 2015/093905 | 6/2015 |
| WO | WO2015174048 | 11/2015 |
| WO | WO2015190157 | 12/2015 |

OTHER PUBLICATIONS

International Search Report in International Application No. PCT/KR2017/004857, dated Jun. 16, 2017, 14 pages (with English translation).

Extended European Search Report in European Appln. No. 22175699.2, dated Oct. 12, 2022, 6 pages.

Extended European Search Report in European Appln. No. 23191310.4, mailed on Jan. 3, 2024, 14 pages.

* cited by examiner

HEAD-UP DISPLAY FOR VEHICLE

CROSS-REFERENCE TO RELATED APPLICATIONS

This application is a continuation of U.S. application Ser. No. 16/793,397, filed on Feb. 18, 2020, which is a continuation of U.S. application Ser. No. 15/663,261, filed on Jul. 28, 2017, now U.S. Pat. No. 10,606,075, which claims the benefit of an earlier filing date of and the right of priority to Korean Application No. 10-2016-0163753, filed on Dec. 2, 2016, the contents of which are incorporated by reference herein in their entirety.

TECHNICAL FIELD

The present application relates to technologies about a head-up display for a vehicle.

BACKGROUND

A vehicle is an apparatus capable of moving a user in the user-desired direction, and a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

On the other hand, a head-up display for a vehicle is a device provided in the vehicle to emit image light toward a windshield of the vehicle. The head-up display for a vehicle may display various information including traveling information while driving the vehicle.

The head-up display for a vehicle may include a display panel configured to generate and display image light, and at least one mirror configured to reflect the image light generated from the display panel.

The image light generated from the display panel may be incident to a windshield of the vehicle by the mirror, and a driver may recognize a virtual image at a front position of the windshield.

When the head-up display for a vehicle includes two image sources, two virtual images may be formed, and in this case, it may be possible to enhance the convenience of the head-up display for a vehicle.

SUMMARY

An aspect of the present disclosure is to provide a head-up display for a vehicle and a control method thereof capable of changing a display position, a size, a depth, a transparency (brightness), an inclination, and the like of a plurality of virtual images displayed through a windshield of the vehicle to implement augmented reality.

The tasks to be solved in the present invention may not be limited to the aforementioned, and other problems to be solved by the present invention will be obviously understood by a person skilled in the art based on the following description.

In order to accomplish the foregoing tasks, a head-up display for a vehicle according to an embodiment of the present disclosure may include:
a mirror unit comprising a first mirror for reflecting first and second image lights toward a windshield of the vehicle;
a display layer located at the windshield of the vehicle to display a first virtual image corresponding to the first image light in a first region, and display a second virtual image corresponding to the second image light in a second region; and
a controller configured to change an inclination of the first mirror to change display positions of the first and the second virtual image.

According to an embodiment, the controller may change an inclination of the first mirror to allow the first virtual image and the second virtual image to be separated from each other.

According to an embodiment, the controller may change an inclination of the first mirror to allow the first virtual image and the second virtual image to connect to each other.

According to an embodiment, the controller may change an inclination of the first mirror to allow the first virtual image and the second virtual image to overlap with each other.

According to an embodiment, the display layer may display a first virtual image corresponding to linearly-polarized light in a first direction in a first display region of the windshield of the vehicle, and display a second virtual image corresponding to linearly-polarized light in a second direction in a second display region of the windshield of the vehicle.

According to an embodiment, the mirror unit may include an image generator configured to emit linearly-polarized light in a first direction, and linearly-polarized light in a second direction orthogonal to the first direction; a second mirror disposed to be separated from the first mirror so as to transmit linearly-polarized light in the first direction, and reflect linearly-polarized light in a second direction to the first mirror; a third mirror disposed to be separated from the second mirror so as to reflect linearly-polarized light in the first direction that has transmitted through the second mirror to the first mirror; and a first rotation mechanism configured to change an inclination of the first mirror.

According to an embodiment, the mirror unit may further include a second rotation portion configured to change an inclination of the second mirror; and a third rotation portion configured to change an inclination of the third mirror.

According to an embodiment, the controller may allow the first virtual image and the second virtual image to overlap with each other according to a distance between vehicles.

According to an embodiment, the controller may change the display positions of the first virtual image and the second virtual image according to a distance between vehicles, and change information displayed on the first virtual image and information displayed on the second virtual image according to the distance between vehicles.

According to an embodiment, the controller may display a first graphic object matching a current traveling road and indicating a distance between vehicles on the current traveling road in a first region of the second virtual image, and display a second graphic object matching an adjacent road corresponding to a traveling lane to be changed and indicating a distance between vehicles on the adjacent road in a second region of the second virtual image when a change for the traveling lane is requested.

According to an embodiment, when a first vehicle enters between the vehicle and a preceding vehicle, and a distance between the vehicle and the first vehicle is less than a reference distance, the controller may change a display position of the first virtual image to allow the first virtual image to overlap with the first vehicle, and when the distance between the vehicle and the first vehicle exceeds the reference distance, the controller may change a display position of the second virtual image to allow the second virtual image to overlap with the first vehicle.

According to an embodiment, when road guide information located at a traveling road is detected by a camera, the controller may display an image corresponding to the detected road guide information on the second virtual image, and change an inclination of the image displayed on the second virtual image according to a position of the road guide information and a distance between vehicles.

According to an embodiment, the controller may allow the first and the second virtual image to overlap so as to exhibit a stereoscopic image.

According to an embodiment, the controller may change a size and display position of a first road guide image displayed on the first virtual image and a size and display position of a second road guide image displayed on the second virtual image to exhibit a stereoscopic image.

According to an embodiment, when a distance to a preceding vehicle is less than a reference distance, the controller may change a display position of the second virtual image while at the same changing a display position of a graphic object displayed on the second virtual image on which the display position thereof is changed not to allow the second virtual image and the preceding vehicle to overlap with each other.

According to an embodiment, when displaying road guide information on a road the vehicle should enter at a current intersection, the controller may display a graphic object that matches a road the vehicle should not enter at the current intersection on the second virtual image while at the same displaying the road guide information on the first virtual image.

According to an embodiment, the controller may gradually raise up a graphic object that matches a road the vehicle should not enter as the vehicle is closer to the current intersection, and gradually lay down an image corresponding to the road guide information displayed on the first virtual image as the vehicle is closer to the current intersection.

According to an embodiment, when displaying a current speed of the vehicle on the first virtual image, and displaying a turn-by-turn image indicating a cornering section on the second virtual image, the controller may display an image indicating that the vehicle can understeer when the current speed of the vehicle exceeds a vehicle entry reference speed of the cornering section on the turn-by-turn image.

According to an embodiment, when a road guide image located at a road on which the vehicle travels is detected, the controller may detect information associated with a path from a current position to a destination from the detected road guide image, and display only an image corresponding to the associated information from the detected road guide image on the virtual image.

In order to accomplish the foregoing tasks, there is provided a method of a head-up display for a vehicle including a mirror unit comprising a first mirror for reflecting first and second image lights toward a windshield of the vehicle; and a display layer located at the windshield of the vehicle to display a first virtual image corresponding to the first image light and a second virtual image corresponding to the second image light, and the method may include changing an inclination of the first mirror to change display positions of the first and the second virtual image.

In addition, the specific details of embodiments are included in the detailed description and drawings.

According to an embodiment of the present disclosure, there are one or more of the following effects.

The present disclosure may change a display position, a size, a depth, a transparency (brightness), an inclination, and the like of a plurality of virtual images displayed through a windshield of the vehicle, thereby effectively implementing augmented reality.

The effects of the present invention may not be limited to those effects, and other effects which have not been mentioned may be obviously understood by those skilled in the art from the appending claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the Drawings.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
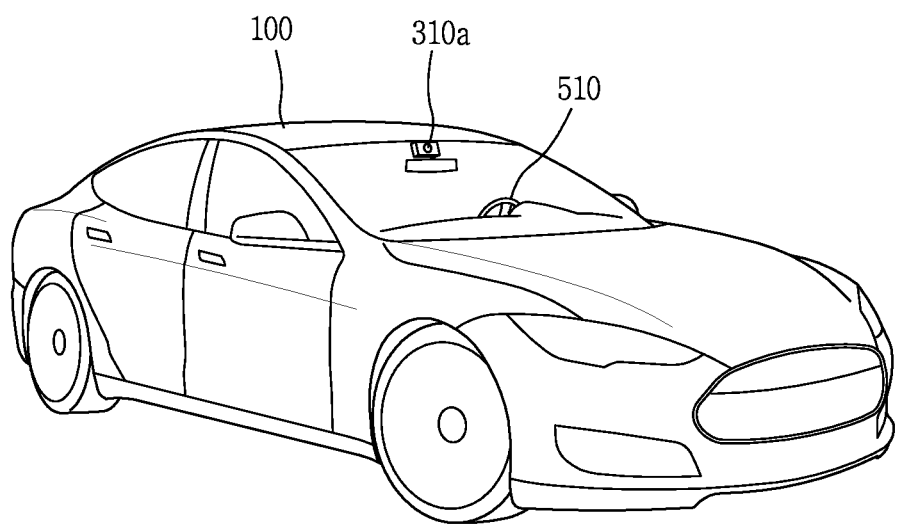
FIG. 1 is a view illustrating an appearance of a vehicle according to an embodiment of the present disclosure.
Figure 1:
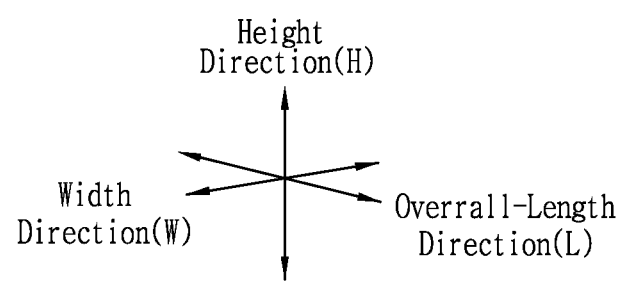

FIG. 1 is a view illustrating appearance of a vehicle in accordance with an embodiment of the present invention.

Figure 2:
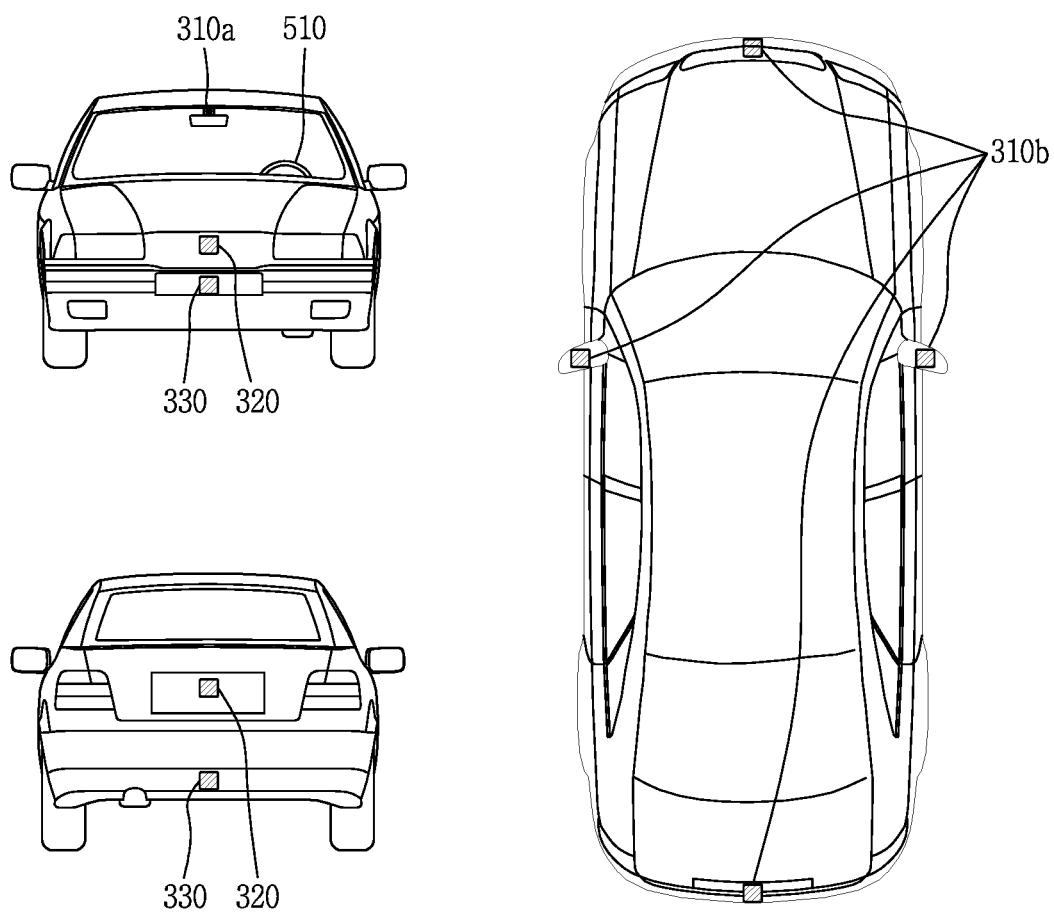
FIG. 2 is a view in which a vehicle according to an embodiment of the present disclosure is seen at various angles.

FIG. 2 is a view illustrating appearance of a vehicle at various angles in accordance with an embodiment of the present invention.

Figure 3:
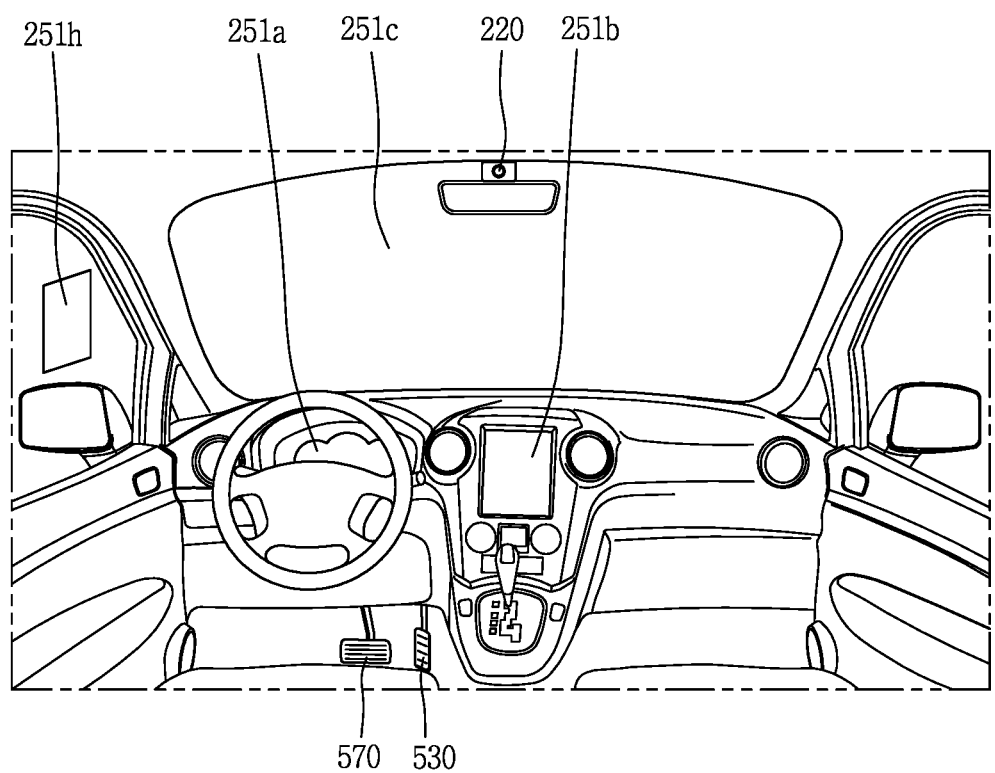
FIGS. 3 and 4 are views illustrating an inside of a vehicle according to an embodiment of the present disclosure.
Figure 4:
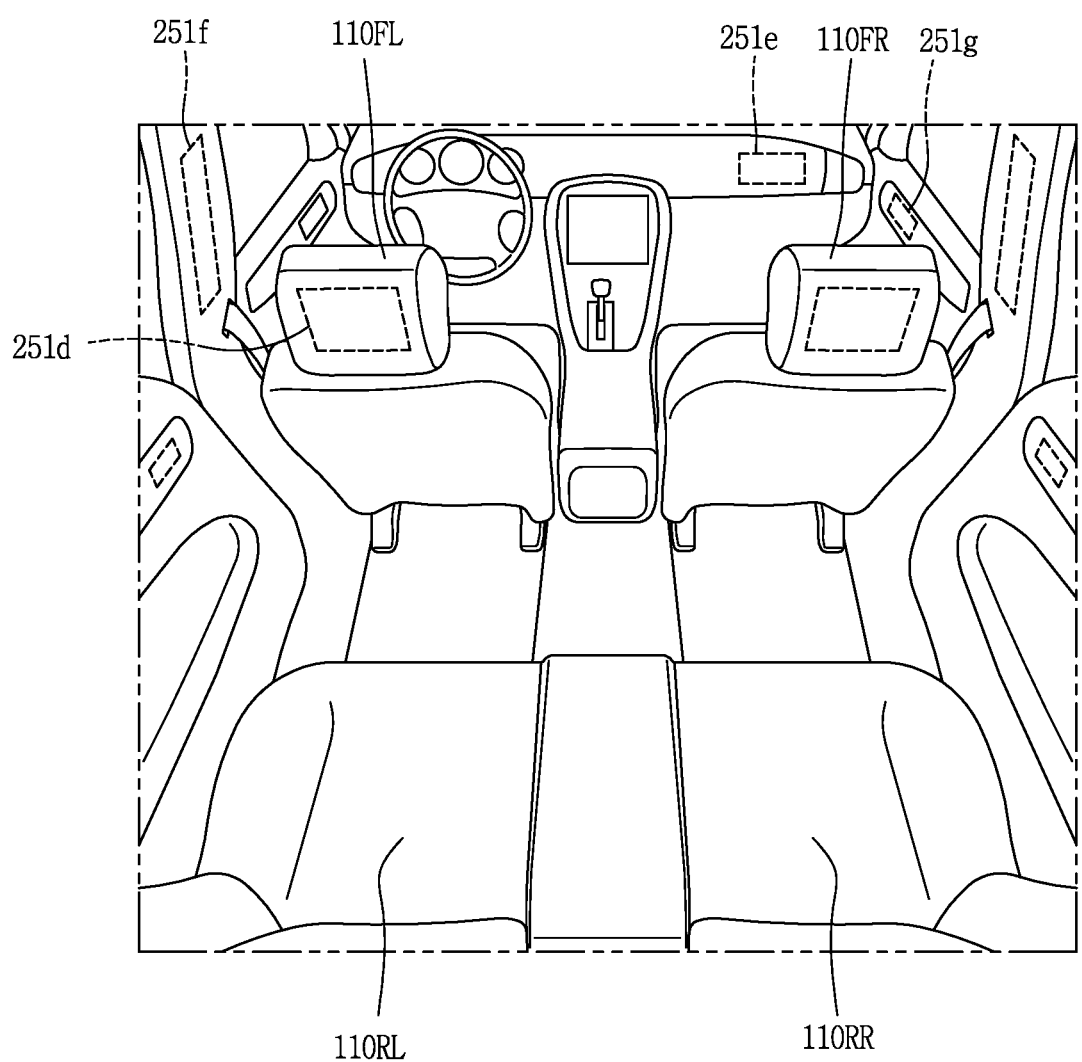

FIGS. 3 and 4 are views illustrating an inside of a vehicle in accordance with an embodiment of the present invention.

Figure 5:
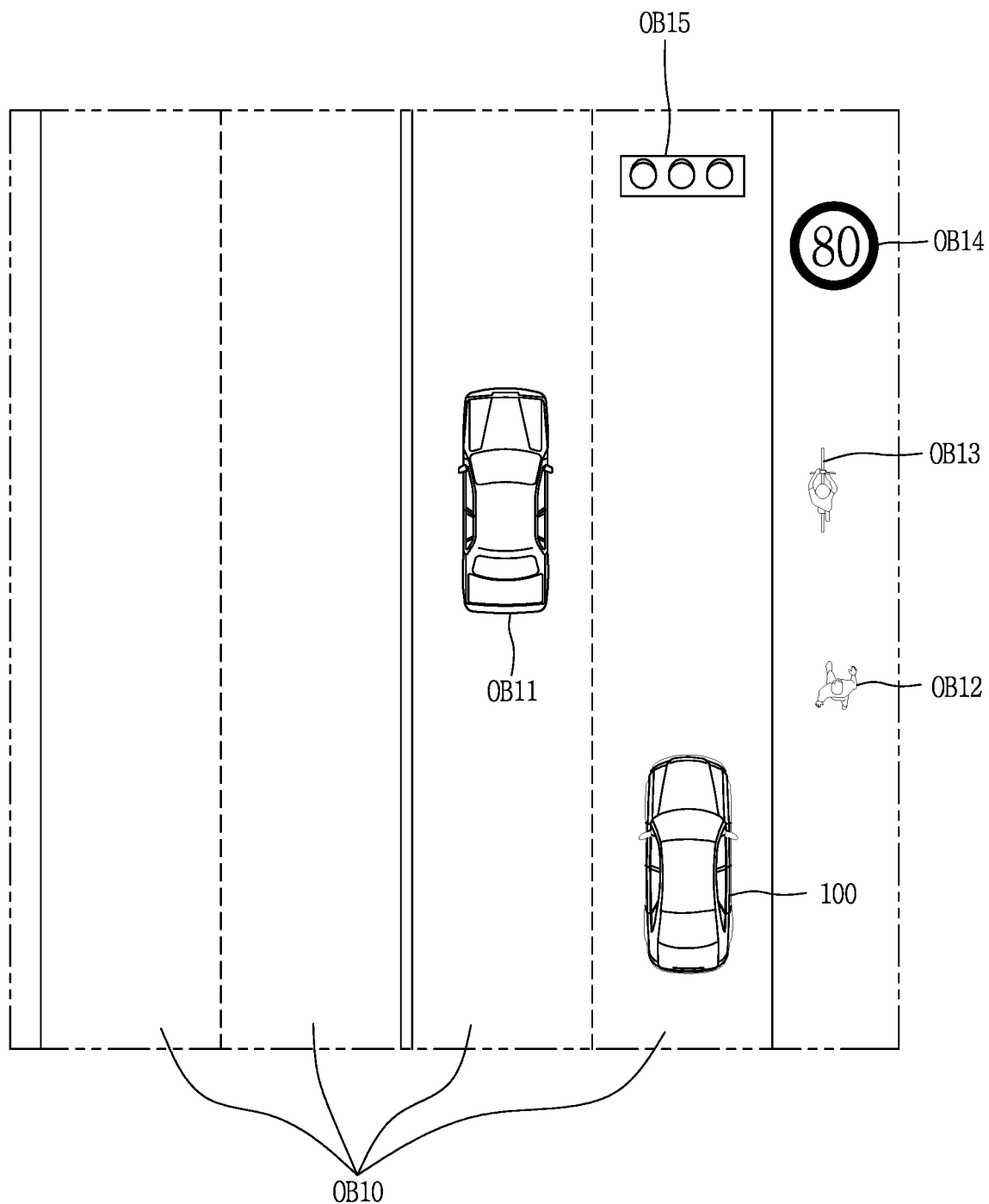
FIGS. 5 and 6 are views referred for explaining objects according to an embodiment of the present disclosure.
Figure 6:
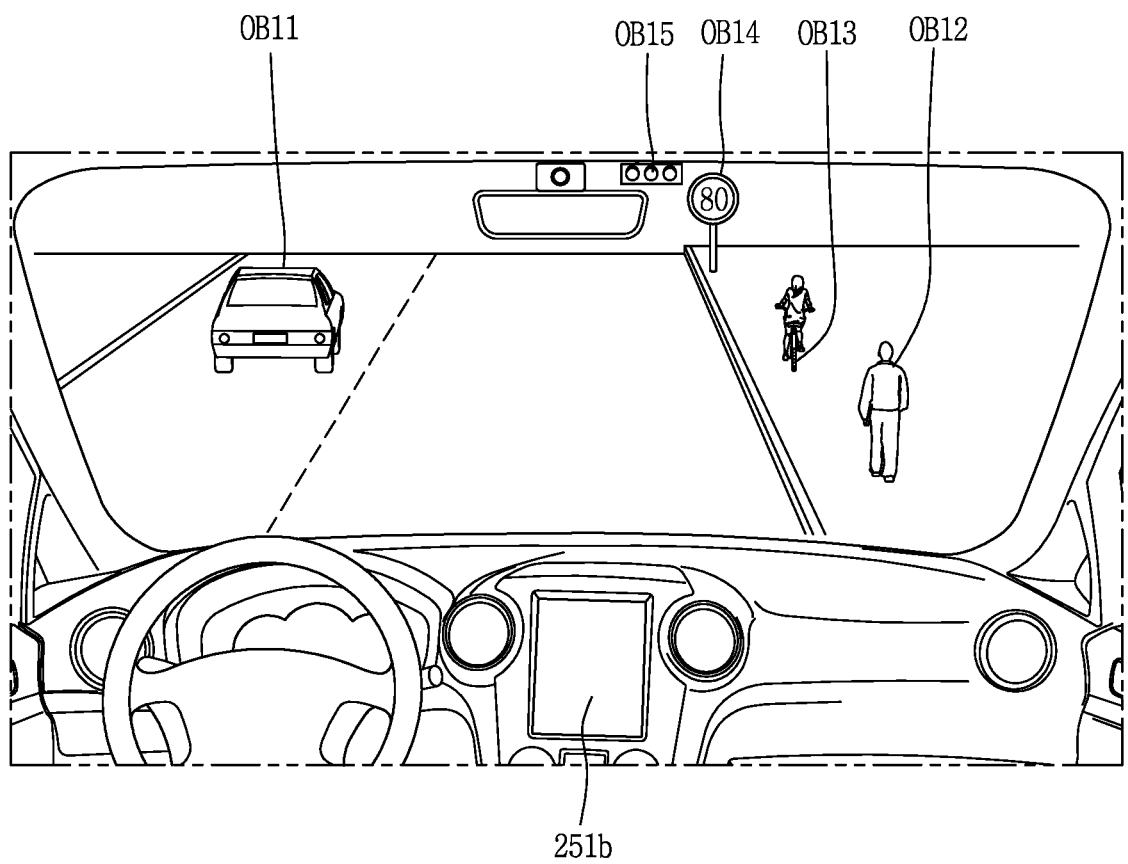

FIGS. 5 and 6 are reference views illustrating objects in accordance with an embodiment of the present invention.

Figure 7:
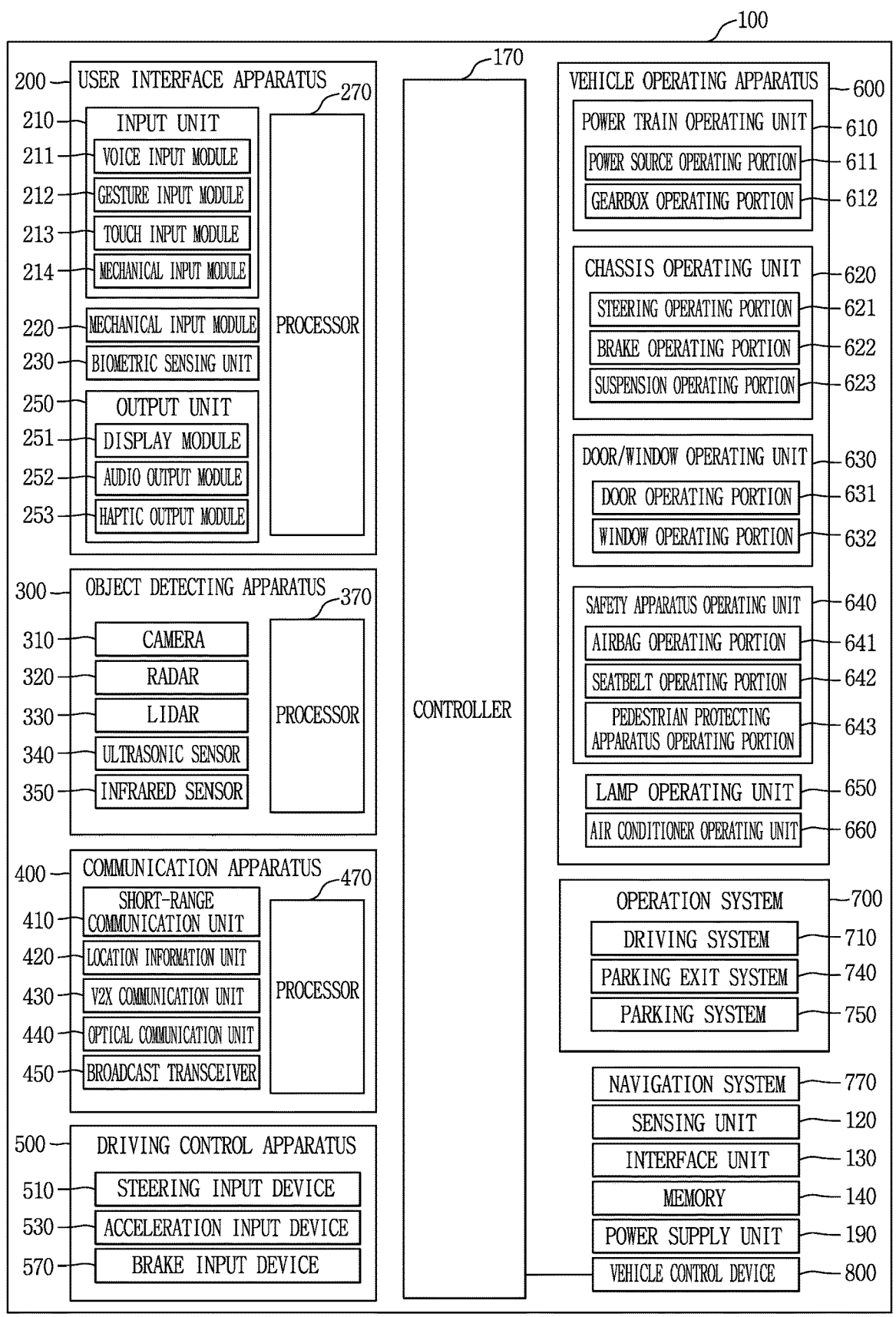
FIG. 7 is a block diagram referred for explaining a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user may recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine may be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8:
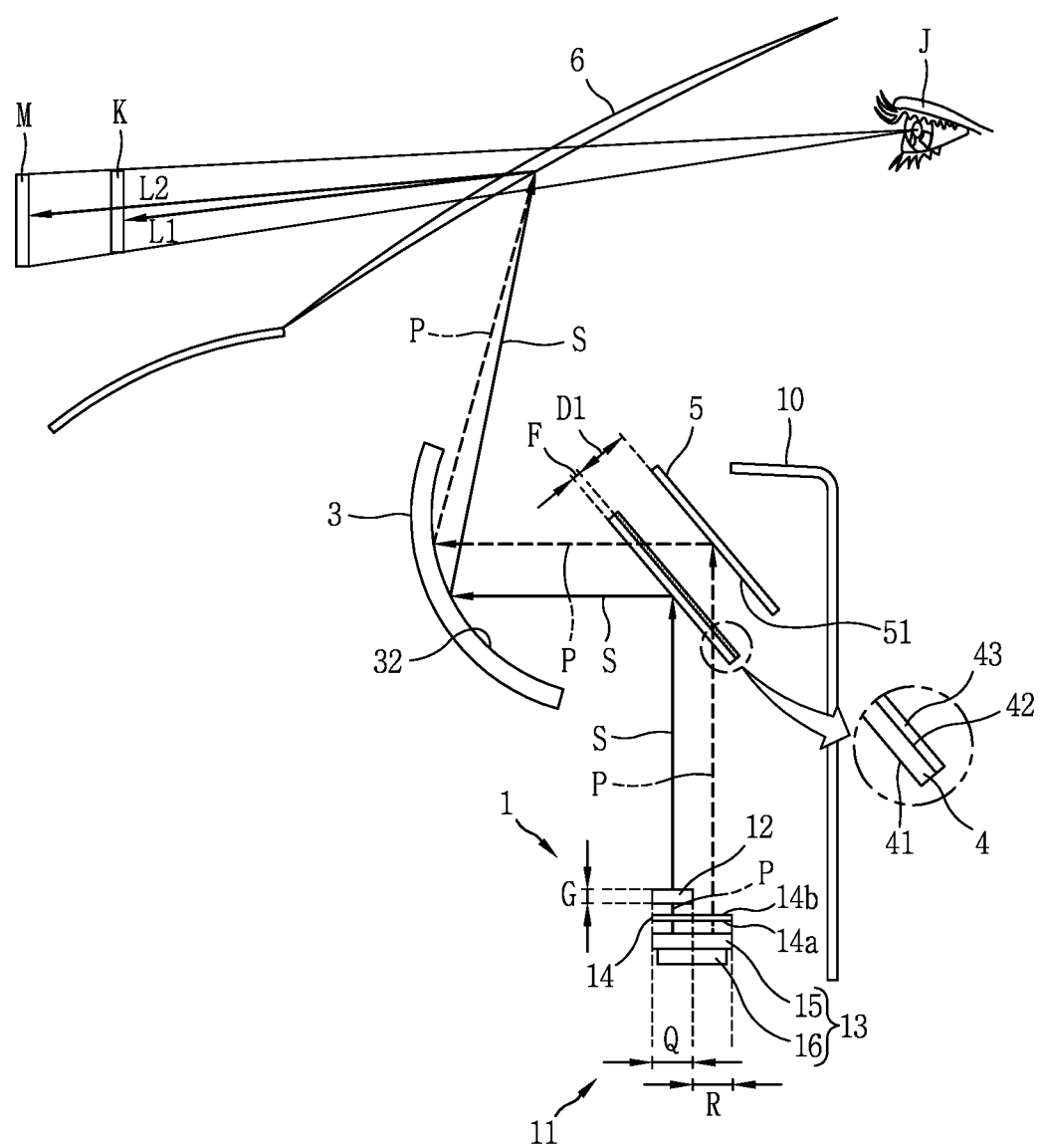
FIG. 8 is a side view illustrating the main configuration of a head-up display for a vehicle for explaining the embodiments of the present disclosure.
Figure 9:
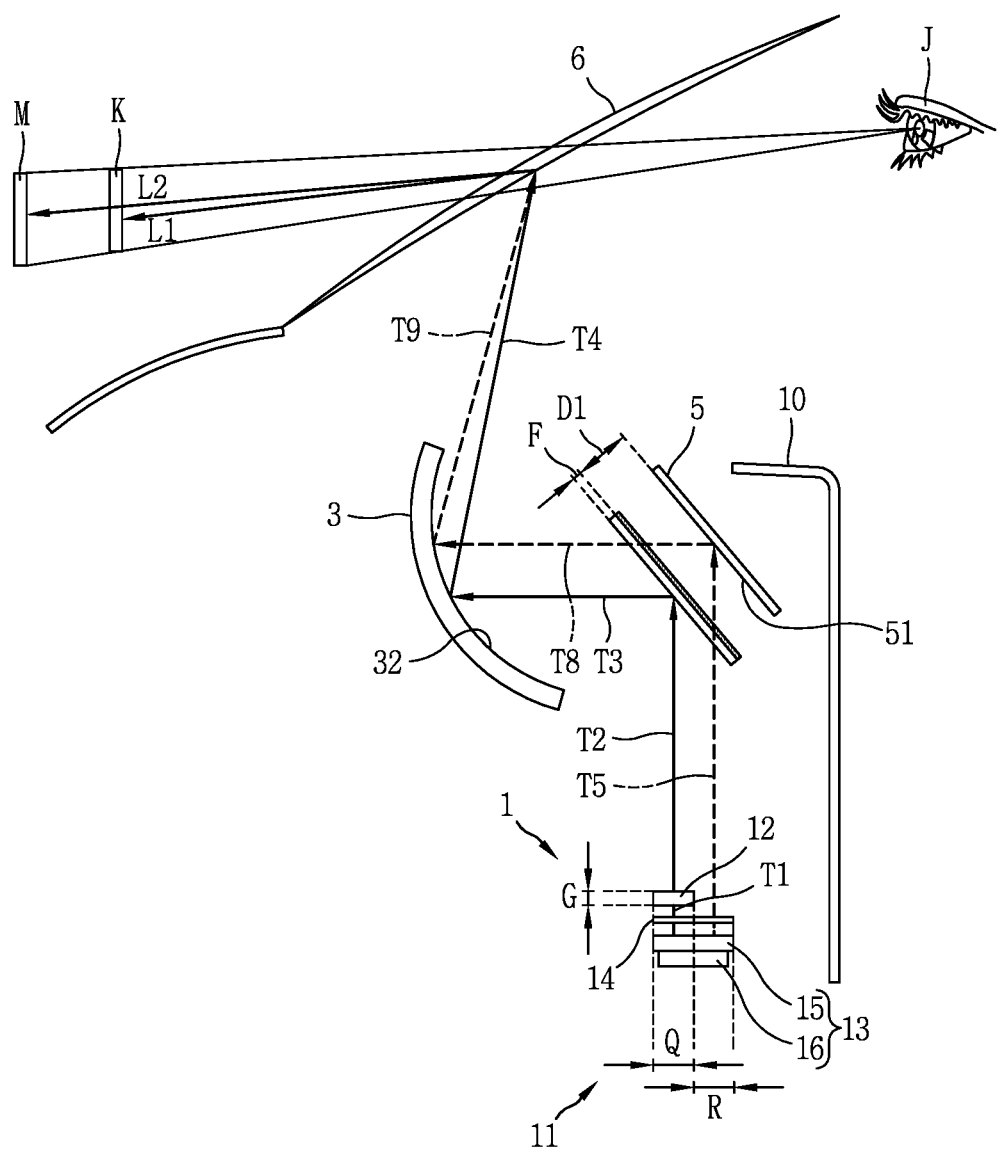
FIG. 9 is a side view illustrating an optical path of a head-up display for a vehicle for explaining the embodiments of the present disclosure.

FIG. 8 is a side view illustrating the main configuration of a head-up display for a vehicle for explaining the embodiments of the present disclosure, and FIG. 9 is a side view illustrating an optical path of a head-up display for a vehicle for explaining the embodiments of the present disclosure.

A head-up display for a vehicle may include an image mechanism 1, a first reflective mirror 3, a polarized reflective mirror 4, and a second reflective mirror 5.

The head-up display for a vehicle may emit image light toward a windshield 6 of the vehicle.

The head-up display for a vehicle may be accommodated into an instrument panel 10 in front of a driver's seat in the vehicle or mounted on the instrument panel 10 to emit image light in an upward direction.

The image mechanism (image generator) 1 may emit linearly-polarized light in a first direction and linearly-polarized light a second direction orthogonal to the first direction.

The image mechanism (image generator) 1 may include an image source 11 configured to emit first linearly-polarized light and a half-wave phase retarder 12 configured to convert a part of linearly-polarized light in a first direction emitted from the image source 11 into linearly-polarized light in a second direction orthogonal to the first direction by a half wavelength.

The image source 11 may include a display panel 13 configured to emit image light, and a linear polarizer 14 configured to linearly polarize the image light emitted from the display panel 13 in a first direction.

The display panel 13 may include a display element 15 and a light source 16 configured to emit light to the display element 15.

The display panel 13 may emit image light toward the linear polarizer 14. The display panel 13, as an image generating unit, may be a display device configured to control electric signals to generate image light such as a liquid crystal display (LCD) panel, a light emitting diode (LED) panel, an organic light emitting diode (OLED) panel, and the like.

The light source 16 may be a backlight unit (BLU) capable of emitting light toward the display element 15. An LED, an OLED or the like may be applicable to the light source 16.

The linear polarizer 14 may pass only the linearly-polarized light in the first direction out of the image light emitted from the display panel 13. Non-polarized light that is not polarized may be emitted from the display panel 13, and the non-polarized light may be polarized in the first direction in the linear polarizer 14. P-wave linearly-polarized light (P) or S-wave linearly-polarized light (S) may be emitted from the linear polarizer 14.

The linear polarizer 14 may be provided within the display device 15, and in this case, linearly-polarized light polarized by the linear polarizer 14 may be emitted from the display device 15.

The linear polarizer 14 may be disposed at an outside of the display element 15 and in this case, the non-polarized light emitted from the display element 15 may be incident on the linear polarizer 14, and linearly-polarized light that is polarized in a first direction may be emitted from the linear polarizer 14.

When the linear polarizer 14 is disposed at an outside of the display element 15, the linear polarizer 14 may be disposed such that one surface 14A faces the display element 15. The linear polarizer 14 may be disposed such that the other surface 14B faces a polarized reflective mirror 4.

For the linear polarizer 14, one surface 14A facing the display panel 13 may be a light incident surface on which light is incident and the other surface 14B may be a light exit surface.

The linear polarizer 14 may be disposed to cover the light exit surface of the display element 15.

When the display panel 13 emits non-polarized light in an upward direction, the linear polarizer 14 may be disposed to be located at an upper side of the display panel 15.

When the display panel 13 emits non-polarized light in a downward direction, the linear polarizer 14 may be disposed to located at a lower side of the display panel 15.

The half-wave phase retarder (half wave plate; HWP) 12 may convert the linearly-polarized light incident from the image source 11 by a ½ wavelength.

For example, when the linearly-polarized light emitted from the image source 11 is P-wave linearly-polarized light (P), the P-wave linearly-polarized light (P) may be incident on the half-wave phase retarder 12, and converted into S-wave linearly-polarized light (S), and the S-wave linearly-polarized light (S) may be emitted out of the half-wave phase retarder 12.

On the contrary, when the linearly-polarized light emitted from the image source 11 is S-wave linearly-polarized light (S), the S-wave linearly-polarized light (P) may be incident on the half-wave phase retarder 12, and converted into P-wave linearly-polarized light (P), and the P-wave linearly-polarized light (S) may be emitted out of the half-wave phase retarder 12.

The half-wave phase retarder 12 may be disposed between a light exit surface of the image source 11 and one surface 41 of the polarized reflective mirror 4. When the image source 11 includes the linear polarizer 14, the light exit surface 14B of the linear polarizer 14 may be a light exit surface of the image source 11.

The half-wave phase retarder 12 may convert a part of linearly-polarized light in a first direction emitted from the image source 11 into linearly-polarized light in a second direction orthogonal to the first direction by a half wavelength.

The half-wave phase retarder 12 may be smaller in size than the linear polarizer 14. The half-wave phase retarder 12 may be smaller in size than the light exit surface 14B of the linear polarizer 14.

Furthermore, the half-wave phase retarder 12 may face a partial region of the linear polarizer 14. The half-wave phase retarder 12 may face only a part of the light exit surface of the linear polarizer 14 but may not face the other region on the light exit surface of the linear polarizer 14.

A part of the linearly-polarized light emitted from the linear polarizer 14 may be incident on the half-wave phase retarder 12 and converted by a half wavelength. The remaining linearly-polarized light emitted from the linear polarizer 14 may not be incident on the half-wave phase retarder 12, and directed to the polarized reflective mirror 4.

The linear polarizer 14 may include a first region (Q) facing one surface of the half-wave phase retarder 12 and a second region R facing one surface of the polarized reflective mirror 4.

The linearly-polarized light in the first direction emitted from the first region (Q) of the linear polarizer 14 is incident on the half-wave phase retarder 12 and converted into linearly-polarized light in the second direction by a half wavelength, and emitted from the half-wave phase retarder 12 toward the polarized reflective mirror 4.

On the contrary, the linearly-polarized light in the first direction emitted from the second region (R) of the linear polarizer 14 is not incident on the half-wave phase retarder 12 but directed to the polarized reflective mirror 4 through the vicinity of the half-wave phase retarder 12.

For example, when the P-wave linearly-polarized light (P) is emitted from both the first region (Q) and the second region (R) of the linear polarizer 14, the P-wave linearly-polarized light (P) emitted from the first region (Q) among the P-wave linearly-polarized light (P) may be converted into the S-wave linearly-polarized light (S) in the half-wave phase retarder 12 and then directed to the polarized reflective mirror 4. Furthermore, the P-wave linearly-polarized light (P) emitted from the second region (R) among the P-wave linearly-polarized light (P) may be directed to the polarized reflective mirror 4 in a state of the P-wave linearly-polarized light (P) without changing its wavelength by the linear polarizer 14.

The image mechanism 1, which is a combination of the image source 11 and the half-wave phase retarder 12, may be a type of heterogeneous linear-polarized light transmitter for emitting two linearly-polarized lights having different polarization directions through different regions.

The first reflective mirror 3 may reflect light to the windshield 6 of the vehicle.

The first reflective mirror 3 may reflect light reflected by the polarized reflective mirror 4 or light transmitted through the polarized reflective mirror 4 toward the windshield 6.

The first reflective mirror 3 may be disposed in front of the polarized reflective mirror 4.

A rear face 32 of the first reflective mirror 3 may face a front face 41 of the polarized reflective mirror 4 in a forward and backward direction. The first reflective mirror 3 may be a concave mirror.

The first reflective mirror 3 may be disposed to be inclined at a predetermined angle to reflect the light reflected by the polarized reflective mirror 4 or transmitted through the polarized reflective mirror 4 in an upward direction. Here, the upward direction may include not only a vertical direction but also an upward direction inclined in a predetermined angle backward direction and an upward direction inclined in a predetermined angle forward direction.

The polarized reflective mirror 4 may be a light separator that transmits linearly-polarized light in the same direction as the linearly-polarized light emitted from the image source 11 and reflects linearly-polarized light in a direction orthogonal to the linearly-polarized light emitted from the image source 11.

The polarized reflective mirror 4 may be disposed to be separated from the first reflective mirror 3 at a rear side of the first reflective mirror 3. The polarized reflective mirror 4 may be a selective polarizing element that transmits linearly-polarized light in a first direction therethrough and reflects linearly-polarized light in a second direction therefrom. The polarized reflective mirror 4 is preferably configured with a wire grid polarizer (WGP) disposed at a rear side of the first reflective mirror 3. The wire grid polarizer reflects linearly-polarized light orthogonal to its polarization transmission axis therefrom, and transmits linearly-polarized light in parallel with the polarization transmission axis of the wire grid polarizer through the wire grid polarizer.

The polarized reflective mirror 4, which is a wire grid polarizer, may maintain the brightness of light between the first reflective mirror 3 and the second reflective mirror 5, and maintain the selective transmission/reflection performance while allowing light incident on the image source 11, half-wave phase retarder 12 and second reflective mirror 5, respectively, to be incident at a wide angle of incidence.

When the linearly-polarized light in the first direction is the P-wave linearly-polarized light (P), the polarized reflective mirror 4 may transmit the P-wave linearly-polarized light (P) therethrough, and reflect the S-wave linearly-polarized light (S) therefrom. On the contrary, when the linearly-polarized light in the first direction is the S-wave linearly-polarized light (S), the polarized reflective mirror 4 may transmit the S-wave linearly-polarized light (S) therethrough, and reflect the P-wave linearly-polarized light (P) therefrom.

The polarized reflective mirror 4 may be disposed to face the half-wave phase retarder 12 and image source 11 in an upward and downward direction and face the first reflective mirror 3 in a forward and backward direction.

The polarized reflective mirror 4 may be a wire grid polarizer that transmits linearly-polarized light in a first direction emitted from the second region (R) of the image source 11 therethrough, and reflects linearly-polarized light in a second direction emitted from the half-wave phase retarder 12 to the first reflective mirror 3.

The linearly-polarized light in the first direction that has transmitted through the polarized reflective mirror 4 may be incident on the second reflective mirror 5 and reflected toward a rear surface 42 of the polarized reflective mirror 4 on the second reflective mirror 5, and the linearly-polarized light in the first direction reflected toward the rear surface 42 of the polarized reflective mirror 4 may be transmitted through the polarized reflective mirror 4, and directed to the first reflective mirror 3 through the front surface 41 of the polarized reflective mirror 4.

The polarized reflective mirror 4, which is a selective polarizing element, may have an advantage capable of realizing two virtual images while minimizing the loss of light compared to a half mirror, and reducing the brightness of the image source 11 since the loss of light is small, thereby reducing the power consumption of the image source 11, decreasing a size of the heat radiator (not shown) for radiating the image source 11 or simplifying the structure of the heat radiator.

The polarized reflective mirror 4 may be disposed between the first reflective mirror 3 and the second reflective mirror 5 for the forward reflection of the linearly-polarized light in the second direction and the forward transmission of linearly-polarized light in the first direction as described above, and disposed between the first reflective mirror 3 and the second reflective mirror 5 in an inclined manner.

Since the polarized reflective mirror 4 selectively transmits or reflects linearly-polarized light between the two reflective mirrors 3 and 5, according to the present embodiment, it may be possible to minimize a number of optical components for forming two virtual images as well as further reduce an overall size of the head-up display for a vehicle.

The front surface 41 of the polarized reflective mirror 4 may be inclined to face a front lower side thereof. The back surface 42 of the polarized reflective mirror 4 may face a rear upper side thereof, and the rear surface 42 of the polarized reflective mirror 4 may face the front surface 51 of the second reflective mirror 5.

The polarized reflective mirror 4 may further include an anti-reflection coating layer 43 formed on a surface 42 facing the second reflective mirror 5 between both surfaces 41, 42 thereof. Here, the anti-reflection coating layer 43 may reduce a surface reflection of the surface 42 facing the second reflective mirror 5 on the polarized reflective mirror 4, and reduce a noise due to unwanted reflection light of the transmission light.

In other words, the polarized reflective mirror 4 may increase an amount of light reflected from the second reflective mirror 5 by the anti-reflective coating layer 43 and then transmitted through the polarized reflective mirror 4.

The linearly-polarized light in the first direction reflected from the second reflective mirror 5 and incident on the polarized reflective mirror 4 may be incident on the polarized reflective mirror 4 while minimizing surface reflection by the anti-reflective coating layer 43.

The second reflective mirror 5 may be disposed to be separated from the polarized reflective mirror 4 to reflect the light transmitted through the polarized reflective mirror 4 to the polarized reflective mirror 4.

The second reflective mirror 5 may be disposed to face the polarized reflective mirror 4. The second reflective mirror 5 is a flat mirror disposed to face the polarized reflective mirror 4.

The second reflective mirror 5 may be disposed in parallel with the polarized reflective mirror 4. The front surface 51 of the second reflective mirror 5 may be inclined to face a front lower side thereof.

The head-up display of the present invention having the foregoing configuration may form a first virtual image (K) at a first position close to the windshield 6, and form a second virtual image (M) at a second position located relatively farther from the windshield 6.

The first virtual image (K) may be formed by a short optical path leading to the image source 11, half-wave phase retarder 12, polarized reflective mirror 4, first reflective mirror 3 and windshield 6.

Furthermore, the second virtual image (M) may be formed by a short optical path leading to the image source 11, polarized reflective mirror 4, first reflective mirror 3, polarized reflective mirror 4, first reflective mirror 3 and windshield 6.

The long optical path may further includes a distance (D1) in which the linearly-polarized light in the first direction moves from the polarized reflective mirror 4 to the second reflective mirror 5, and a distance D1 in which the linearly polarized-light in the first direction reflected from the second reflective mirror 5 moves to the polarized reflective mirror 4 in addition to the short optical path. Furthermore, the long optical path may further include a distance twice as large as a thickness (F) of the polarized reflective mirror 4 in addition to the short optical path.

More specifically, the short optical path may include a first path (T1) in which linearly-polarized light in a first direction emitted from the image element 1 is incident on the half-wave phase retarder 12, a second path (T2) in which linearly-polarized light in a second direction emitted from the half-wave phase retarder 12 is incident on the polarized reflective mirror 4, a third path (T3) in which the linearly-polarized light in the second direction reflected from the polarized reflective mirror 4 is incident on the first reflective mirror 3, and a fourth path (T4) in which the linearly-polarized light in the second direction reflected from the first reflective mirror 3 is incident on the windshield 6.

On the other hand, the long optical path may include a fifth path (T5) in which linearly-polarized light in a first direction emitted from the image element 1 is incident on the polarized reflective mirror 4, a sixth path (T6) in which the linearly-polarized light in the first direction that has transmitted through the polarized reflective mirror 4 is incident on the second reflective mirror 5, a seventh path (T7) in which the linearly-polarized light in the first direction reflected from the second reflective mirror 5 is incident on the polarized reflective mirror 4, an eighth path (T8) in which the linearly-polarized light in the first direction that has transmitted through the polarized reflective mirror 4 is incident on the first reflective mirror 3, and a ninth path (T9) in which the linearly-polarized light in the first direction reflected from the first reflective mirror 3 is incident on the windshield 6.

Here, a length of the fifth path (T5) may correspond to a sum of a length of the first path (T1), a thickness (G) of the half-wave phase retarder 12, and a length of the second path (T2).

Furthermore, the eighth path (T8) may correspond to the third path (T3), and the ninth path (T9) may correspond to the fourth path (T4).

A length (L2) of the long optical path may be greater than a length (L1) of the short optical path by a sum of twice the thickness (F) of the polarized reflective mirror 4, a distance of the sixth path (T6), and a length of the seventh path (T7).

When a distance between the windshield 6 and the first virtual image (K) is L1, a distance between the windshield 6 and the second virtual image (M) is L2, a distance between the polarized reflective mirror 4 and second reflective mirror 5 is D1, and a thickness of the polarized reflective mirror 4 is F, the distance L2 between the windshield 6 and the second virtual image (M) may be equal to or larger than a sum of the distance (L1) between the windshield 6 and the first virtual image (K), twice the distance (D1) between the polarized reflective mirror 4 and second reflective mirror 5, and twice the thickness (F) of the polarized reflective mirror 4 (i.e., L1+2×D1+2×F).

Hereinafter, the operation of the present embodiment will be described below.

For the sake of convenience of explanation, an example in which the P-wave linearly-polarized light (P) is emitted from the image source 11 will be described.

A part of the P-wave linearly-polarized light (P) emitted from the image source 11 may be converted into the S-wave linearly-polarized light (S) by the half-wave phase retarder 12 and then directed to the polarized reflective mirror 4, and the rest thereof may be directed to the polarized reflective mirror 4 without converting the wavelength.

The S-wave linearly-polarized light (S) incident on the front surface 41 of the polarized reflective mirror 4 may be reflected to the first reflective mirror 3 by the polarized reflective mirror 4, and reflected by the first reflective mirror 3, and reflected to the windshield 6 by the first reflective mirror 3.

On the contrary, the P-wave linearly-polarized light (P) incident on the front surface 41 of the polarized reflective mirror 4 may be transmitted through the polarized reflective mirror 4 and directed to the second reflective mirror 5, and reflected to the polarized reflective mirror 4. The P-wave linearly-polarized light (P) reflected to the polarized reflective mirror 4 on the second reflective mirror 5 may be transmitted through the polarized reflective mirror 4 and then directed to the first reflective mirror 3, and the P-wave linearly-polarized light (P) directed to the first reflective mirror 3 may be reflected to the windshield 6 by the first reflective mirror 3.

A driver may recognize the first virtual image (K) formed by a short optical path and the second virtual image (M) formed by a long optical path through the windshield 6.

The head-up display for a vehicle may form two virtual images (K, M) having different distances from the windshield 6, and the two virtual images (K, M) having different distances may be recognized by the eyes (J) of the driver who gets in the vehicle.

On the other hand, an example in which the S-wave linearly-polarized light S is emitted from the image source 11 differs from an example in which the P-wave linearly-polarized light P is emitted from the image source 11 in only the type of linearly-polarized light, and the operations thereof are the same, and thus the detailed description thereof will be omitted to avoid redundant explanations.

Figure 10:
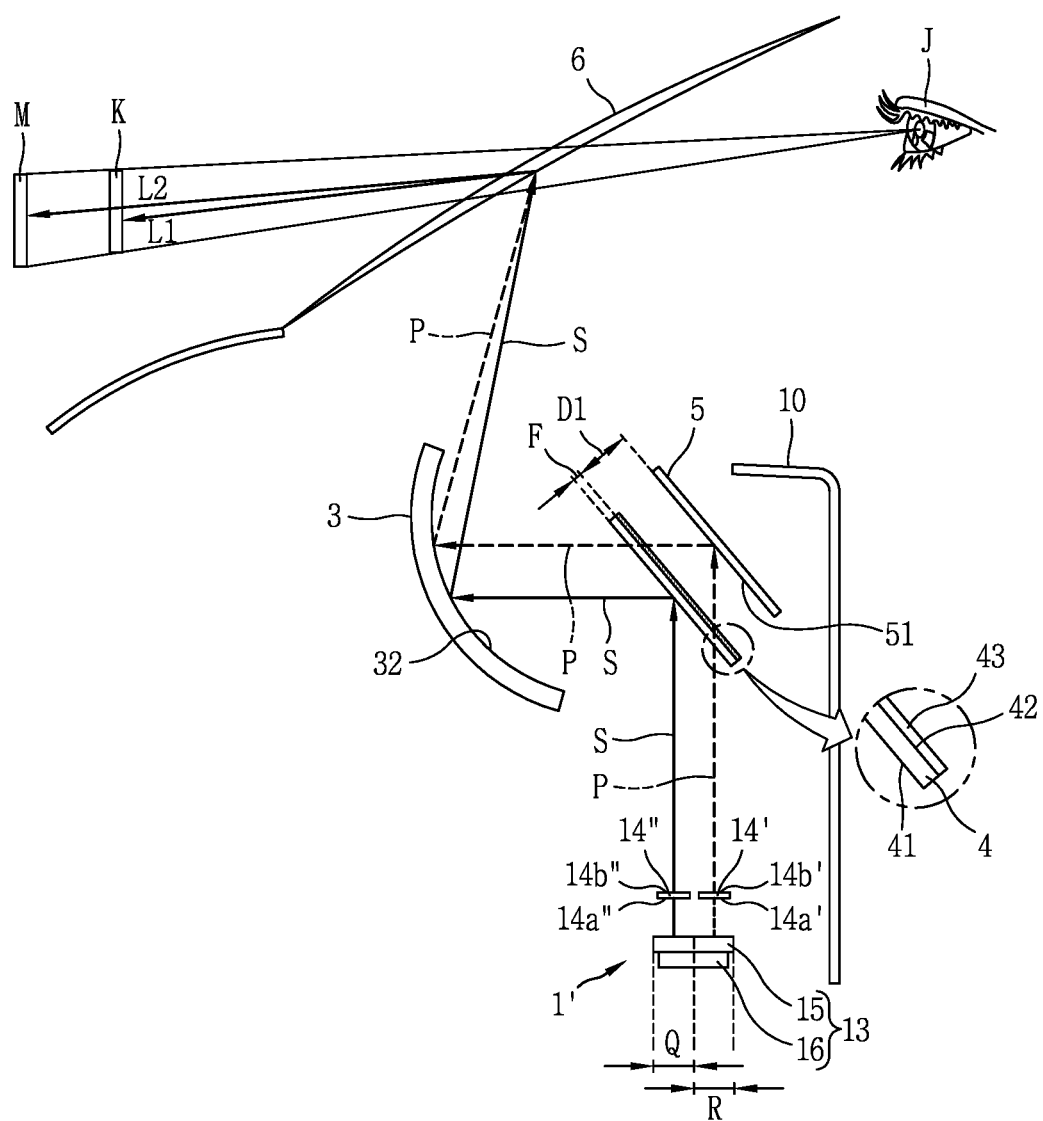
FIG. 10 is another side view illustrating the main configuration of a head-up display for explaining the embodiments of the present disclosure.

FIG. 10 is another side view illustrating the main configuration of a head-up display for explaining the embodiments of the present invention, in which the image mechanism 1' is different from that of FIG. 8, and the same as or similar to those of FIGS. 8 and 9, and the same reference numerals will be used, and thus the detailed description thereof will be omitted.

The image mechanism 1' may include a display panel 13 for emitting image light, a first linear polarizer 14' for linearly polarizing the image light emitted from the display panel 13 in a first direction, and a second linear polarizer 14" for linearly polarizing the image light emitted from the light source 14 in a second direction orthogonal to the first direction.

The display panel 13 may include a display device 15 and a light source 16 as illustrated in the first embodiment of the present invention, and the detailed description thereof will be omitted.

The first linear polarizer 14' and the second linear polarizer 14" may be disposed to face different regions of the display panel 13.

The first linear polarizer 14' and the second linear polarizer 14" may transmit linearly-polarized light in mutually different directions.

The first linear polarizer 14' may transmit only linearly-polarized light in the first direction among the image light emitted from the display panel 13. The display panel 13 may emit non-polarized light that is not polarized, and polarize non-polarized light in a first direction in the first linear polarizer 14'.

The second linear polarizer 14" may transmit only linearly-polarized light in the second direction among the image light emitted from the display panel 13. The display panel 13 may emit non-polarized light that is not polarized, and polarize non-polarized light in a first direction in the second linear polarizer 14".

When the P-wave linearly-polarized light (P) is emitted from the first linear polarizer 14', the S-wave linearly-polarized light (S) may be emitted from the second linear polarizer 14". On the contrary, when the S-wave linearly-polarized light (S) is emitted from the first linear polarizer 14', the P-wave linearly-polarized light (P) may be emitted from the second linear polarizer 14".

The light incident surface 14A' of the first linear polarizer 14' may face a part of the light exit surface of the display panel 13, and the light incident surface 14A" of the second linear polarizer 14" may face another part of the light exit surface of the display panel 13.

The light exit surface 14B' of the first linear polarizer 14' may face a part of the polarized reflective mirror 4, and the light exit surface 14B" of the second linear polarizer 14" may face a part of the light exit surface of the polarized reflective mirror 4.

The polarized reflective mirror 4 may transmit linearly-polarized light emitted from either one of the first linear polarizer 14' and the second linear polarizer 14"; and reflect linearly-polarized light emitted from the other one of the first linear polarizer 14' and the second linear polarizer 14".

On the other hand, the polarized reflective mirror 4 may be disposed to face both the first linear polarizer 14' and the second linear polarizer 14" in an upward and downward direction, and face the first reflective mirror 3 in a forward and backward direction.

The polarized reflective mirror 4 may include a first region facing the first linear polarizer 14' in an upward and downward direction, and a second region facing the second linear polarizer 14" in an upward and downward direction. Linearly-polarized light in a first direction may be incident on a first region of the polarized reflective mirror 4, and the linearly-polarized light in the first direction may be transmitted through the polarized reflective mirror 4 and incident on the second reflective mirror 5.

Linearly-polarized light in a second direction emitted from the second linear polarizer 14" may be incident on a second region of the polarized-light reflective mirror 4, and the linearly-polarized light in the second direction incident on the second region is incident may be reflected to the first reflective mirror 3 by the polarized reflective mirror 4.

The present embodiment may form a first virtual image (K) at a first position close to the windshield 6 and form a second virtual image (M) at a second position located relatively farther from the windshield 6.

The first virtual image (K) is formed by a short optical path leading to the display panel 13, second linear polarizer 14", polarization reflective mirror 4, first reflective mirror 3, and windshield 6.

Furthermore, the second virtual image (M) may be formed by a short optical length leading to the display panel 13, first linear polarizer 14', polarized reflective mirror 4, second reflective mirror 5, polarized reflective mirror 4, first reflective mirror 3 and windshield 6.

Hereinafter, for the sake of convenience of explanation, an example in which linearly-polarized light in a first direction is P-wave linearly-polarized light and linearly-polarized light in a second direction is S-wave linearly-polarized light will be described.

Non-polarized image light emitted from the display panel 13 may be dispersed into the first linear polarizer 14' and the second linear polarizer 14".

Light incident on the first linear polarizer 14' may be linearly polarized in the first linear polarizer 14' and the P-wave linearly-polarized light (P) may be emitted from the first linear polarizer 14'.

Furthermore, light incident on the second linear polarizer 14" may be linearly polarized in the second linear polarizer 14", and the S-wave linearly-polarized light (S) may be emitted from the second linear polarizer 14".

The S-wave linearly-polarized light (S) emitted from the second linear polarizer 14" may be reflected to the first reflective mirror 3 by the polarized reflective mirror 4, and reflected to the windshield 6 by the first reflective mirror 3.

On the other hand, the P-wave linearly-polarized light (P) emitted from the first linear polarizer 14' may be transmitted through the polarized reflective mirror 4 and directed to the second reflective mirror 5, and reflected to the polarized reflective mirror 4 by the second reflective mirror 5. The P-wave linearly-polarized light (P) reflected to the polarized reflective mirror 4 on the second reflective mirror 5 may be directed to the first reflective mirror 3 through the polarized reflective mirror 4, and the P-wave linearly-polarized light (P) directed to the first reflective mirror 3 may be reflected to the windshield 6 by the first reflective mirror 3.

A driver may recognize a first virtual image (K) formed by a short optical path and a second virtual image (M) formed by a long optical path through the windshield 6.

Figure 11:
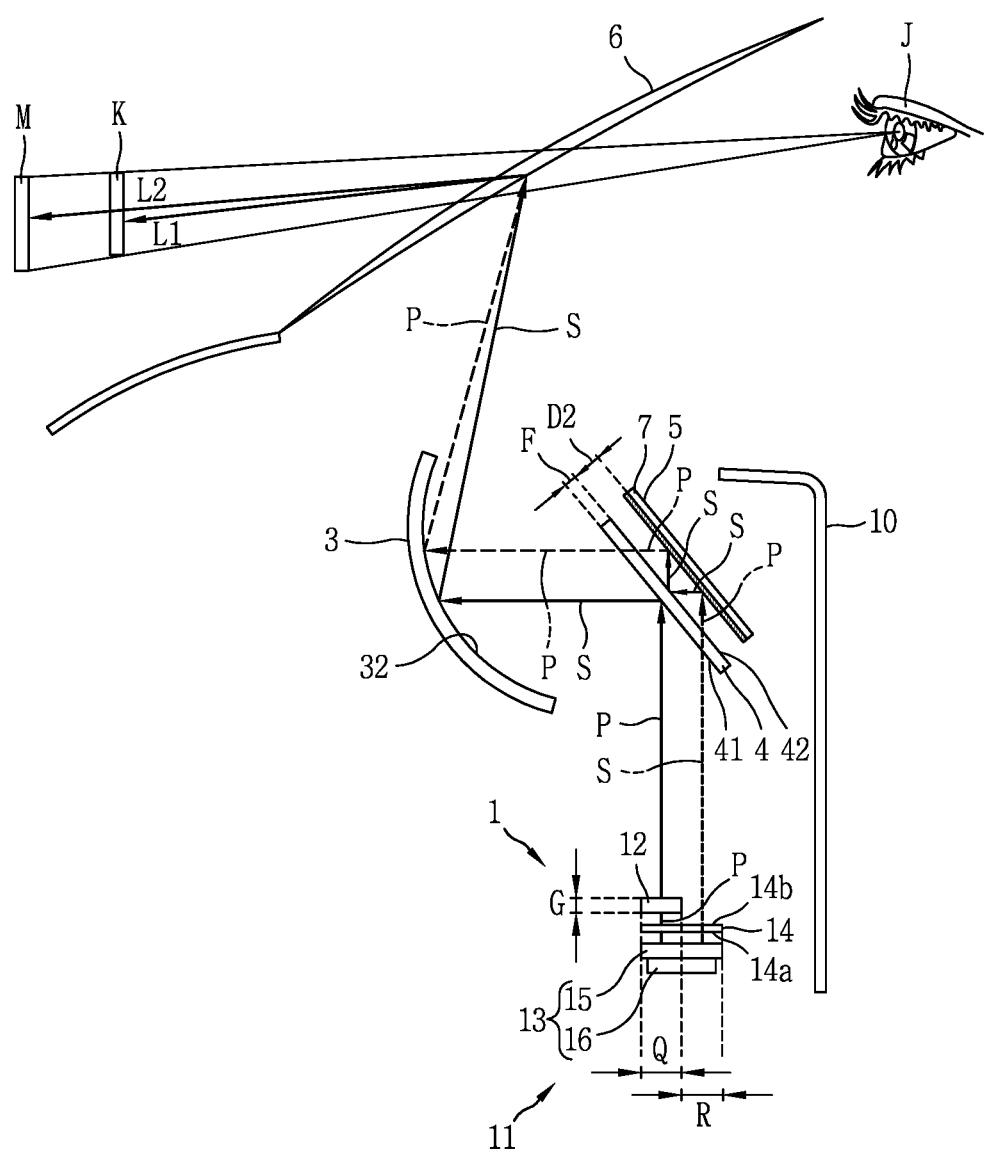
FIG. 11 is still another side view illustrating the main configuration of a head-up display for a vehicle for explaining the embodiments of the present disclosure.
Figure 12:
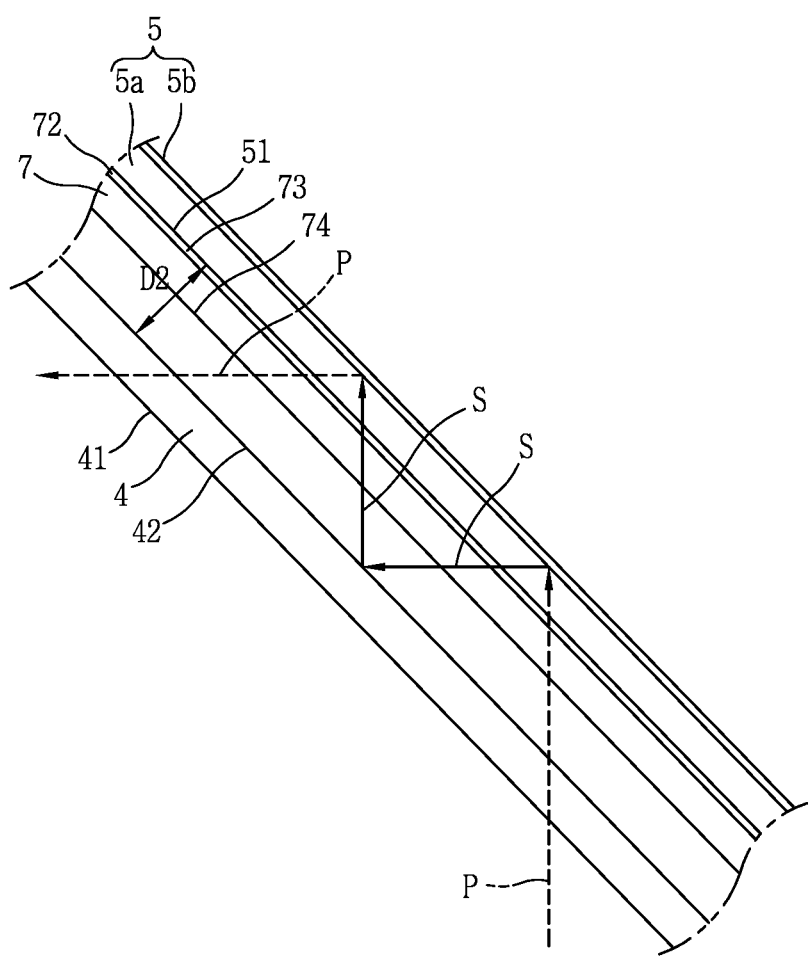
FIG. 12 is an enlarged side view illustrating a quarter-wave phase retarder, a second reflective mirror, and a polarized reflective mirror illustrated in FIG. 11.
Figure 13:
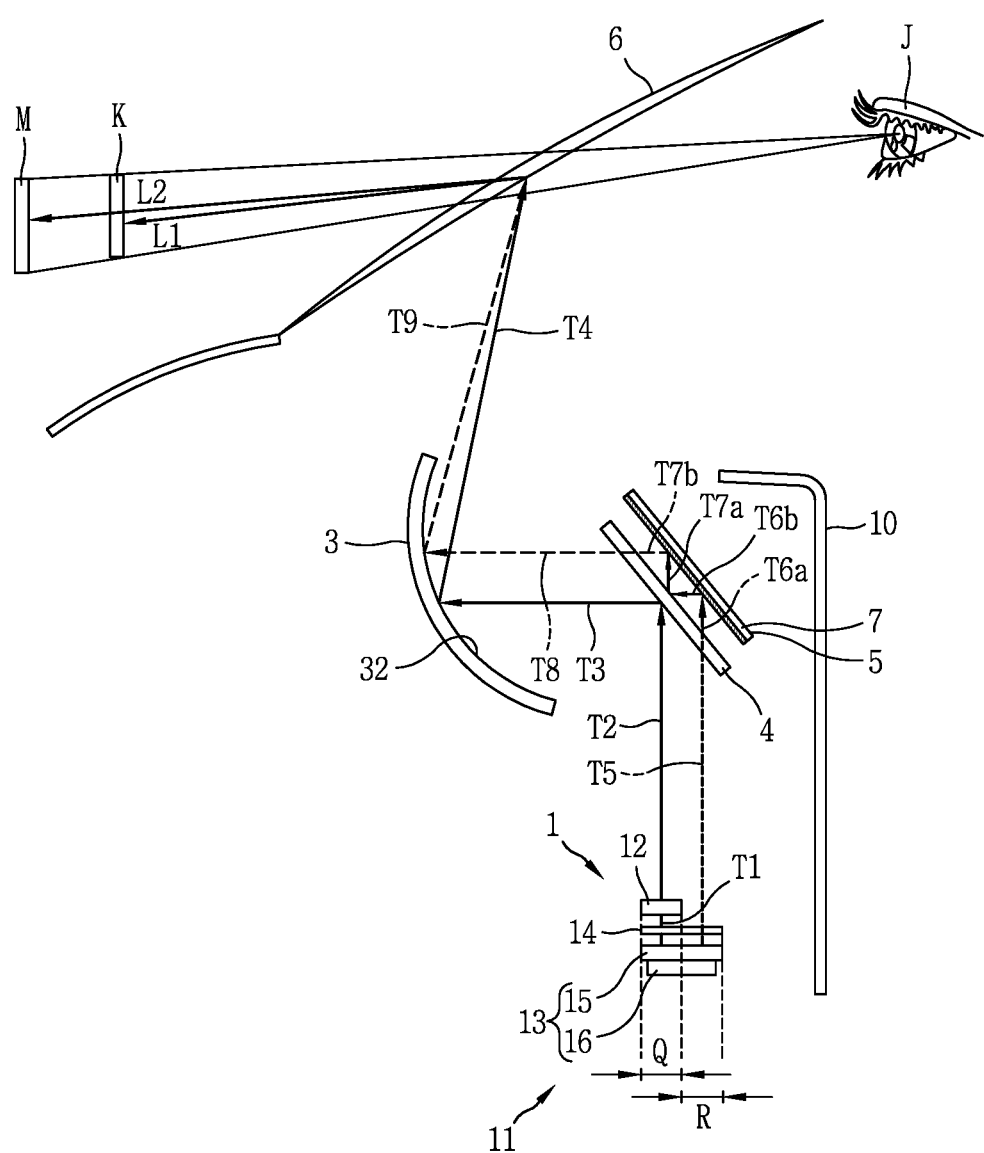
FIG. 13 is another side view illustrating an optical path of a head-up display for a vehicle for explaining the embodiments of the present disclosure.

FIG. 11 is still another side view illustrating the main configuration of a head-up display for a vehicle for explaining the embodiments of the present disclosure, and FIG. 12 is an enlarged side view illustrating a quarter-wave phase retarder, a second reflective mirror, and a polarized reflective mirror illustrated in FIG. 11, and FIG. 13 is another side view illustrating an optical path of a head-up display for a vehicle for explaining the embodiments of the present disclosure.

The head-up display for a vehicle may include a quarter-wave phase retarder 7 disposed between the polarized reflective mirror 4 and the second reflective mirror 5. The other configurations and operations of the head-up display for a vehicle further including the quarter-wave phase retarder 7 are the same as or similar to those of FIGS. 8 to 10, and thus the detailed description thereof will be omitted.

The quarter-wave phase retarder 7 may be a quarter wavelength plate that delays a phase of incident linearly-polarized light by a quarter wavelength.

The quarter-wave phase retarder 7 may be attached to a surface of the second reflective mirror 5 facing the polarization reflection mirror 4. The quarter-wave phase retarder 7 may be attached to the front surface 51 of the second reflective mirror 5.

In the combination of the quarter-wave phase retarder 7 and the second reflective mirror 5, the quarter-wave phase retarder 7 and the second reflective mirror 5 may convert linearly-polarized light in a first direction that has transmitted through the polarized reflective mirror 4 into linearly-polarized light in a second direction and reflect the converted linearly-polarized light in the second direction.

According to the head-up display for a vehicle, the arrangement angles of the image source 11, half-wave phase retarder 12, first reflective mirror 3, polarized reflective mirror 4, and second reflective mirror 5 may be the same as those of FIGS. 8 and 9, and the positions of the image source 11, half-wave phase retarder 12, first reflective mirror 3, and the polarized reflective mirror 4 may be the same as those of FIGS. 8 and 9.

However, in the head-up display for a vehicle, a distance (D2) between the second reflective mirror 5 and the polarized reflective mirror 4 may be smaller than a distance (D1) between the second reflective mirror 5 and the polarized reflective mirror 4 in FIG. 8 or 10.

The quarter-wave phase retarder 7 may function as a half-wave phase retarder that converts a wavelength of the linearly-polarized light incident thereon by a half wavelength and reflects the converted linearly-polarized light along with the second reflective mirror 5, and reduce a space between the polarized reflective mirror 4 and the second reflective mirror 5 by guiding the linearly-polarized light to be reflected a plurality of times on the polarized reflective mirror 4 and second reflective mirror 5.

The second reflective mirror 5 may include a transparent plate 5A and a reflective layer 5B formed on a rear surface of the transparent plate 5A.

A distance between the second reflective mirror 5 and the quarter-wave phase retarder 7 may be preferably as close as possible and the second reflective mirror 5 may be preferably integrally formed with the quarter-wave phase retarder 7.

The quarter-wave phase retarder 7 may be attached to the front surface 51 of the second reflective mirror 5 using an adhesive 72. A rear surface 73 of the quarter-wave phase retarder 7 may be attached to the front surface 51 of the transparent plate 5A using an adhesive, in particular, a transparent adhesive. A front surface 74 of the quarter-wave phase retarder 7 may face the polarization reflective mirror 4.

The fifth path (T5), the eighth path (T8), and the ninth path (T9) of the long optical path may be the same as those of FIGS. 8 and 9.

The sixth path (T6A, T6B) of the long optical path may be different from the sixth path (T6) in FIGS. 8 and 9, and the seventh path (T7A, T7B) may be different from the seventh path (T7) in FIGS. 8 and 9.

The sixth path (T6A, T6B) may include a path (T6A) in which linearly-polarized light in a first direction that has transmitted through the polarized reflective mirror 4 is converted into circularly-polarized light by the quarter-wave phase retarder 7, and the circularly-polarized light is incident on the second reflective mirror 5. Furthermore, the sixth path (T6A, T6B) may further include a path (T6B) in which the circularly-polarized light incident on the second reflective mirror 5 is reflected to the quarter-wave phase retarder 7 by the second reflective mirror 5, and converted into linearly-polarized light in a second direction by the quarter-wave phase retarder 7, and then incident on the polarized reflective mirror 4.

On the other hand, the seventh path (T7A, T7B) may include a path (T7A) in which linearly-polarized light in a second direction, incident on the polarized reflective mirror 4 from the quarter-wave phase retarder 7, is reflected to the quarter-wave phase retarder 7 by the polarized reflective mirror 4, and converted into circularly polarized light by the quarter-wave phase retarder 7, and then incident on the second reflective mirror 5. The seventh path (T7A, T7B) may further include a path (T7B) in which circularly-polarized light incident on the second reflective mirror 5 from the quarter-wave phase retarder 7 is reflected to the quarter-wave phase retarder 7 by the second reflective mirror 5 and converted into linearly-polarized light in a first direction by the quarter-wave phase retarder 7, and then incident on the polarized reflective mirror 4.

The linearly-polarized light transmitted through the polarized reflective mirror 4 may be reflected in a zigzag shape while changing the wavelength between the polarized reflective mirror 4 and the second reflective mirror 5.

The linearly-polarized light that has transmitted through the polarized reflective mirror 4 may be reflected once by the polarized reflective mirror 4 between the polarized reflective mirror 4 and the second reflective mirror 5, and reflected twice by the second reflective mirror 5, and thus reflected three times in total, and by such a three-times reflection structure, the second reflective mirror 5 may be located closer to the polarized reflective mirror 4 compared to the case of FIGS. 8 and 9.

In other words, a distance between the polarized reflective mirror 4 and the second reflective mirror 5 may be further shortened by the quarter-wave phase retarder 7, thereby providing a head-up display for a vehicle with a more compact size compared to the case of FIGS. 8 and 9.

Hereinafter, the operation of the head-up display for a vehicle will be described below. For the sake of convenience of explanation, an example in which P-wave linearly-polarized light (P) is emitted from the image source 11 will be described below.

A part of P-wave linearly-polarized light (P) emitted from the image source 11 may be converted into S-wave linearly-polarized light (S) by the half-wave phase retarder 12 and then directed to the polarized reflective mirror 4, and S-wave linearly-polarized light (S) incident on the front surface 41 of the polarized reflective mirror 4 may be reflected to the first reflective mirror 3 by the polarized reflective mirror 4, and reflected to the windshield 6 by the first reflective mirror 3. In this case, a driver may recognize a first virtual image (K) formed by a short optical path through the windshield 6.

The rest of the P-wave linearly-polarized light (P) emitted from the image source 11 may be directed to the polarized reflective mirror 4 in a state that the wavelength is not converted, and the P-wave linearly-polarized light (P) incident on the front surface of the polarized reflective mirror 4 may be directed to the second reflective mirror 5 through the polarized reflective mirror 4.

The P-wave linearly-polarized light (P) emitted from the polarized reflective mirror 4 toward the second reflective mirror 5 may be converted into circularly-polarized light by the quarter-wave phase retarder 7 and then reflected to the quarter-wave phase retarder 7 by the second reflective mirror 5, and the S-wave linearly-polarized light (S) may be emitted toward the polarized reflective mirror 4 from the quarter-wave phase retarder 7.

The S-wave linearly-polarized light (S) emitted from the quarter-wave phase retarder 7 may be reflected toward the reflection mirror 5 on a rear surface of the polarized reflective mirror 4 without passing through the polarized reflective mirror 4. The S-wave linearly-polarized light (S) reflected from the polarized reflective mirror 4 toward the second reflective mirror 5 may be converted into circularly-polarized light by the quarter-wave phase retarder 7 and then reflected to the quarter-wave phase retarder 7 by the second reflective mirror 5, and the P-wave linearly-polarized light (P) may be emitted from the quarter-wave phase retarder 7 and directed to the polarized reflective mirror 4.

The P-wave linearly-polarized light (P) emitted from the quarter-wave phase retarder 7 to the polarized reflective mirror 4 may be transmitted through the polarized reflective mirror 4 and then directed to the first reflective mirror 3, and the P-wave linearly-polarized light (P) directed to the first reflective mirror 3 may be reflected to the windshield 6 by the first reflective mirror 3. In this case, a driver may recognize a second virtual image (M) formed by a long optical path.

The head-up display for a vehicle may form two virtual images (K, M) having different distances from the windshield 6, and the eyes (J) of the driver may recognize both a first virtual image (K) formed by a short optical path and a second virtual image (M) formed a long optical path through the windshield 6.

An example in which the S-wave linearly-polarized light (S) is emitted from the image source 11 differs from an example in which the P-wave linearly-polarized light (P) is emitted from the image source 11 in only the type of linearly-polarized light, and the operations thereof are the same, and thus the detailed description thereof will be omitted to avoid redundant explanations.

Figure 14:
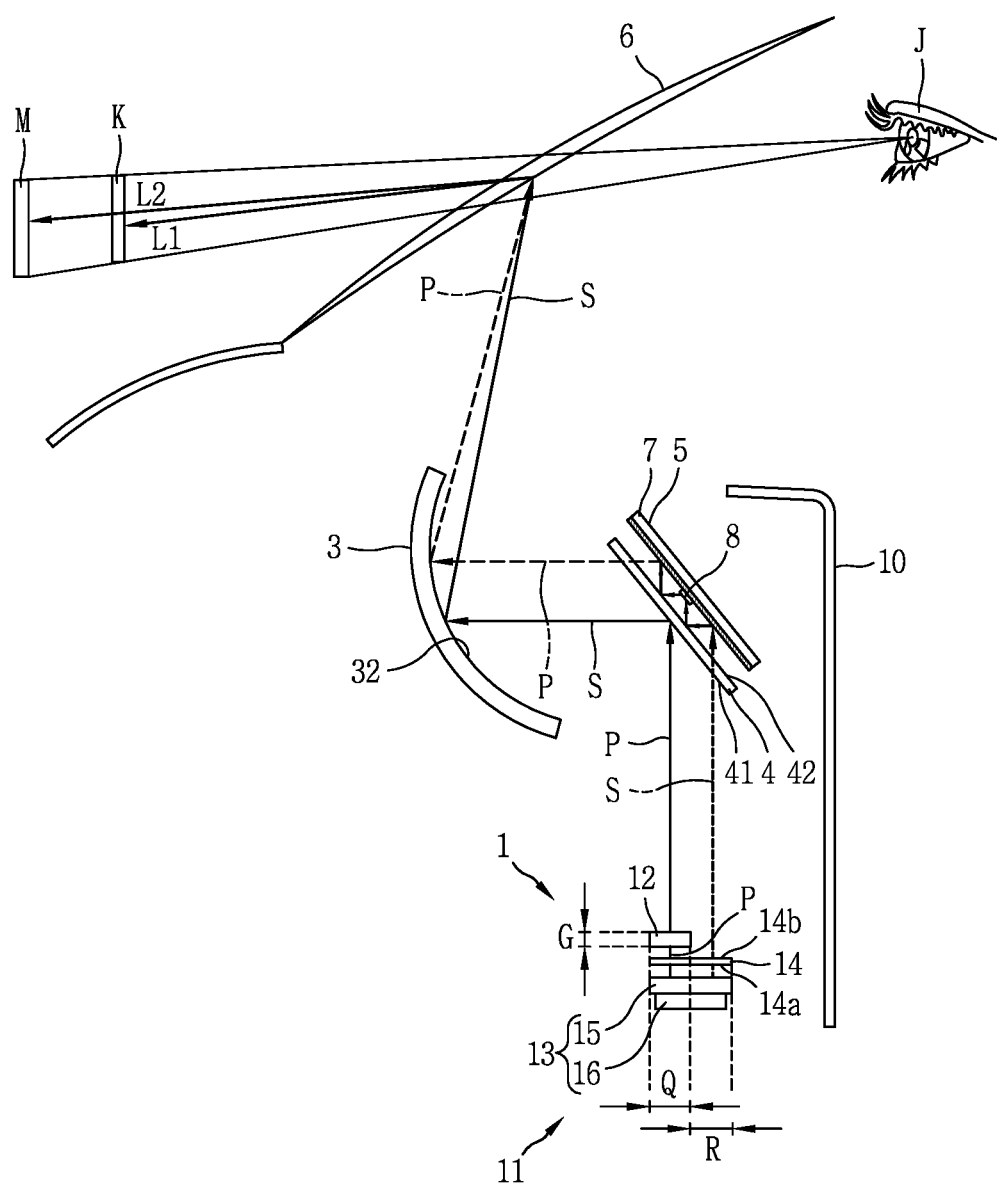
FIG. 14 is yet still another side view illustrating the main configuration of a head-up display for a vehicle for explaining the embodiments of the present disclosure.
Figure 15:
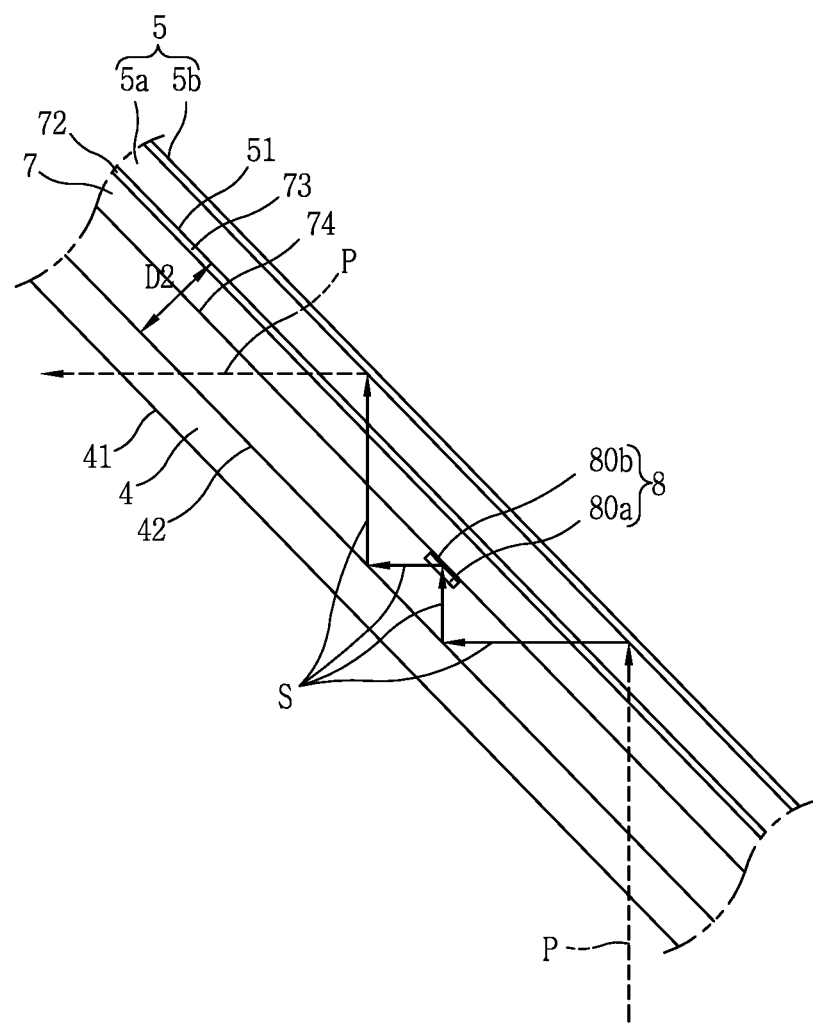
FIG. 15 is an enlarged side view illustrating a quarter-wave phase retarder, a second reflective mirror, a polarized reflective mirror, and a third reflective mirror illustrated in FIG. 14.

FIG. 14 is yet still another side view illustrating the main configuration of a head-up display for a vehicle for explaining the embodiments of the present disclosure, and FIG. 15 is an enlarged side view illustrating a quarter-wave phase retarder, a second reflective mirror, a polarized reflective mirror, and a third reflective mirror illustrated in FIG. 14.

As illustrated in FIGS. 14 and 15, the head-up display for a vehicle may further include a third reflective mirror 8 disposed on a part of the front surface of the quarter-wave phase retarder 7, and the other configurations and operations other than the third reflective mirror 8 will be the same as or similar to those of FIG. 13, and the same reference numerals will be used, and thus the detailed description thereof will be omitted.

The third reflective mirror 8 may be a mirror that reflects light reflected from the polarized reflective mirror 4 back to the polarized reflective mirror 4. The third reflective mirror 8 may be disposed to face the polarized reflective mirror 4 and separated from the polarized reflective mirror 4. The third reflective mirror 8 may be attached to a front surface of the quarter-wave phase retarder 7. The third reflective mirror 8 may be attached to a front face of the quarter-wave phase retarder 7 so as to be separated from the polarized reflective mirror 4.

The third reflective mirror 8 may include a transparent plate 8A and a reflective layer 8B formed on a rear surface of the transparent plate 8A.

The third reflective mirror 8 may be attached to a front surface of the quarter-wave phase retarder 7 using an adhesive. The reflective layer 8B of the third reflective mirror 8 may be attached to a front surface of the quarter-wave phase retarder 7.

The third reflective mirror 8 may be smaller in size than the second reflective mirror 5 and the quarter-wave phase retarder 7, respectively.

In the head-up display for a vehicle, the quarter-wave phase retarder 7, second reflective mirror 5, and third reflection mirror 8 may be configured with one mirror assembly.

The mirror assembly may include a reflection region in which the third reflective mirror 8 is located and a wavelength conversion and reflection region in which the third reflective mirror 8 is not located.

The reflection region may be a first region that totally reflects linearly-polarized light reflected from the polarized reflective mirror 4 to the polarized reflective mirror 4 without wavelength conversion.

Furthermore, the wavelength conversion and reflection region is a second region in which linearly-polarized light reflected from the polarized reflective mirror 4 is transmitted through quarter-wave phase retarder 7 and reflected back to the polarized reflective mirror 4 on the second reflective mirror 5.

The operations of the head-up display for a vehicle will be described below in detail with reference to FIGS. 14 and 15. Hereinafter, for the sake of convenience of explanation, an example in which the P-wave linearly-polarized light (P) is emitted from the image source 11 will be described.

The P-wave linearly-polarized light (P) emitted from the image source 11 and then transmitted through the polarized reflective mirror 4 may be directed to the second reflective mirror 5, and converted into circularly-polarized light by the quarter-wave phase retarder 7, and then reflected to the quarter-wave phase retarder 7 by the second reflective mirror 5, and the S-wave linearly-polarized light (S) may be emitted toward the polarized reflective mirror 4 on the polarized reflective mirror 4.

The S-wave linearly-polarized light (S) emitted from the quarter-wave phase retarder 7 toward the polarized reflective mirror 4 may be reflected on a rear surface of the polarized reflective mirror 4 without passing through the polarized reflective mirror 4. The S-wave linearly-polarized light (S) reflected form the polarized reflective mirror 4 may be incident on the third reflective mirror 8 and totally reflected to the polarized reflective mirror 4 by the third reflective mirror 8 as illustrated in FIG. 15.

The S-wave linearly-polarized light (S) reflected to the polarized reflective mirror 4 by the third reflective mirror 8 may be reflected toward the second reflective mirror 5 on a rear surface of the polarized reflective mirror 4 without passing through the polarized reflective mirror 4. The S-wave linearly-polarized light reflected from the rear surface of the polarized reflective mirror 4 toward the second reflective mirror 5 may be converted into circularly-polarized light by the quarter-wave phase retarder 7 and then reflected to the quarter-wave phase retarder 7 by the second reflective mirror 5, and the P-wave linearly-polarized light (P) may be emitted from the quarter-wave phase retarder 7 and directed to the polarized reflective mirror 4.

The P-wave linearly-polarized light (P) emitted from the quarter-wave phase retarder 7 may be transmitted through the polarized reflective mirror 4 and then directed to the first reflective mirror 3, and the P-wave linear-polarized light (P) may be reflected to the windshield 6 by the first reflective mirror 3. In this case, a driver may recognize a second virtual image (M) formed by a long optical path.

The head-up display for a vehicle in FIGS. 14 and 15 may form a second virtual image (M) at a farther distance than the case of FIG. 3. The head-up display for a vehicle in FIGS. 14 and 15 may include an optical path from a rear surface of the polarized reflective mirror 4 to the third reflective mirror 8, and an optical path from the third reflective mirror 8 to the rear surface of the polarized reflective mirror 4, and thus form a second virtual image (M) at a farther distance than the case of the third embodiment of the present disclosure by the two optical paths.

On the contrary, assuming that the second virtual image (M) is formed at the same distance as illustrated in FIGS. 12 and 13, the head-up display of a vehicle in FIGS. 14 and 15 may have a smaller distance (D3) between the polarized reflective mirror 4 and the second reflective mirror 5 than a distance (D2) between the polarized reflective mirror 4 and the second reflective mirror 5 in FIGS. 12 and 13, and in this case, a width of the head-up display for a vehicle in a forward and backward direction may be smaller than that of FIGS. 12 and 13.

Figure 16:
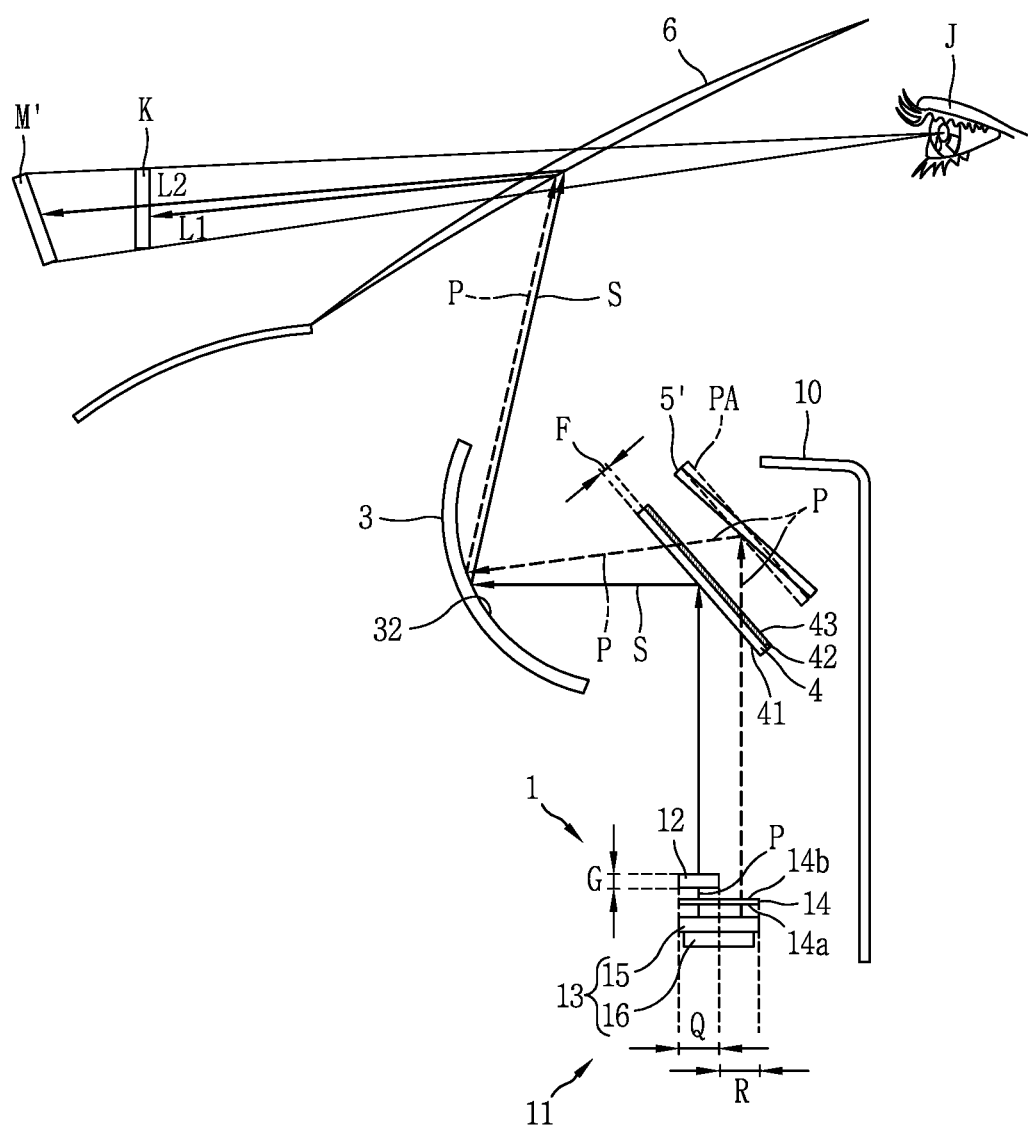
FIG. 16 is still yet another side view illustrating the main configuration of a head-up display for a vehicle for explaining the embodiments of the present disclosure.

FIG. 16 is still yet another side view illustrating the main configuration of a head-up display for a vehicle for explaining the embodiments of the present disclosure.

The head-up display for a vehicle may be disposed such that the second reflective mirror 5' is inclined with respect to the polarized reflective mirror 4.

The second reflective mirror 5' may be installed such that the front surface 51 thereof faces the rear surface 42 of the polarized reflective mirror 4, but the second reflective mirror 5' may not be disposed in parallel with the polarized reflective mirror 4.

The second reflective mirror 5' may be inclined such that an extension of the second reflective mirror 5' in a length direction and an extension of the polarized reflective mirror 4 in a length direction intersect.

In this case, the second reflective mirror 5' may be obliquely reflect first linearly-polarized light toward the polarized reflective mirror 4, and the first linearly polarized-light obliquely incident from the second reflective mirror 5' toward the polarized reflective mirror 4 may be transmitted through the polarized reflective mirror 4 and reflected to the windshield 6 on the first reflective mirror 3.

The second virtual image (M') located at a second position from the windshield 6 may be inclined at a predetermined angle in preparation for a case where the second reflective mirror 5' and the polarized reflective mirror 4 are parallel to each other (PA).

Figure 17:
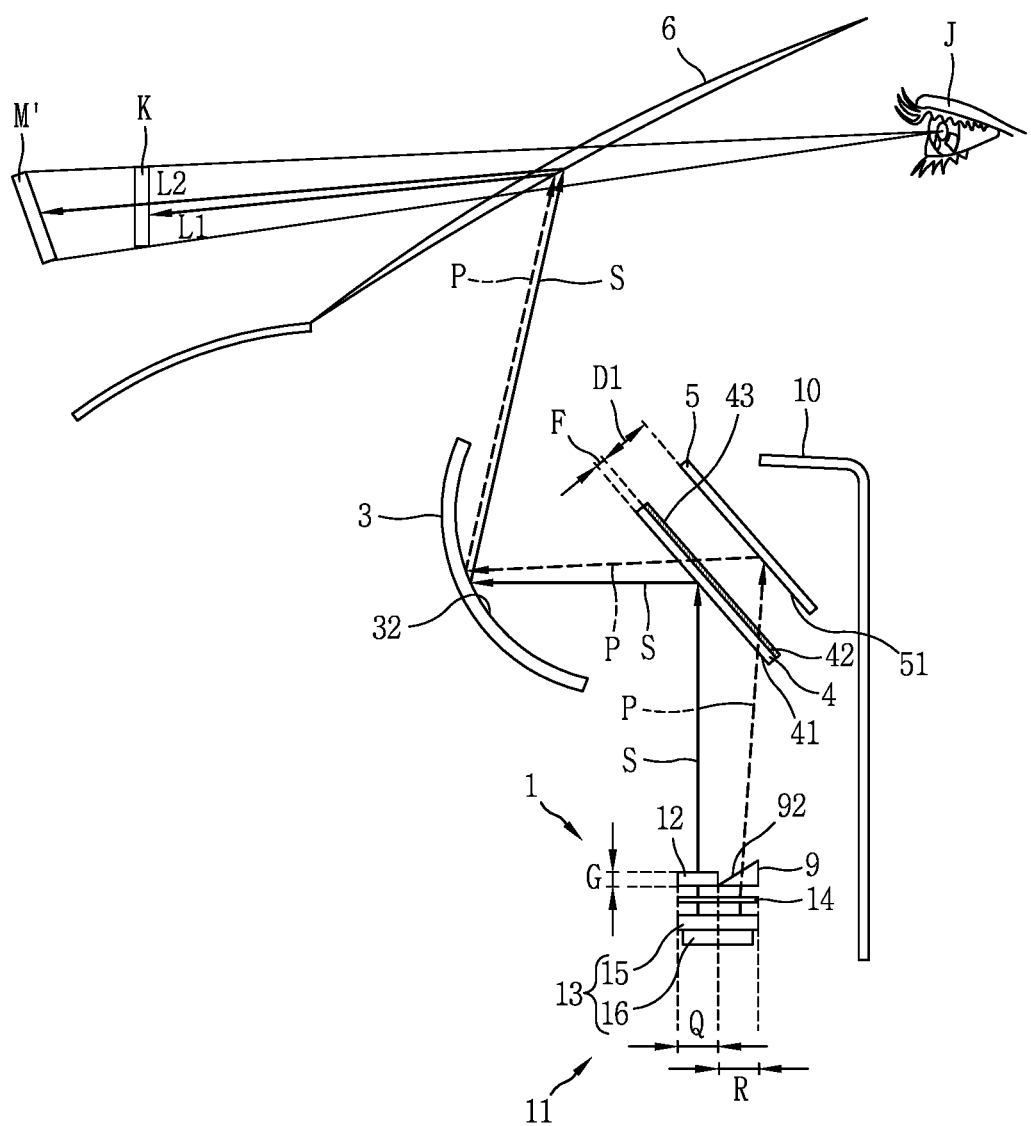
FIG. 17 is yet still another side view illustrating the main configuration of a head-up display for a vehicle for explaining the embodiments of the present disclosure.

FIG. 17 is yet still another side view illustrating the main configuration of a head-up display for a vehicle for explaining the embodiments of the present disclosure.

The half-wave phase retarder 12 may be disposed to face a part of the light exit surface of the image source 11 and the head-up display for a vehicle may further include a prism 9 disposed between the image source 11 and the polarized reflective mirror 4.

The prism 9 may refract first linearly-polarized light emitted from the image source 11 toward an outside of the half-wave phase retarder 12.

The half-wave phase retarder 12 and the prism 9 may be disposed at front and rear sides.

The prism 9 may be disposed so as to be spaced apart from the polarized reflective mirror 4 in an upward and downward direction.

The prism 9 may emit light in a direction in which linearly-polarized light in a first direction is away from linearly-polarized light in a second direction emitted from the half-wave phase retarder 12.

The prism 9 may have a light exit surface 92 inclined in a direction opposite to the front surface 41 of the polarized reflective mirror 4.

The linearly-polarized light in the first direction emitted from the image source 11 may be transmitted through the prism 9 and then deflected in a direction away from the linearly-polarized light in the second direction emitted from the half-wave phase retarder 12, and incident on the polarized reflective mirror 4 and transmitted through the polarized reflective mirror 4.

The linearly-polarized light in the first direction transmitted through the polarized reflective mirror 4 is reflected by the second reflective mirror 5 and transmitted through the polarized reflective mirror 4, and reflected to the windshield 6 by the first reflective mirror 3.

In this case, the second virtual image (M') formed by a long optical path may be inclined at a predetermined angle in preparation for a case where the prism 9 is not provided therein.

Figure 18:
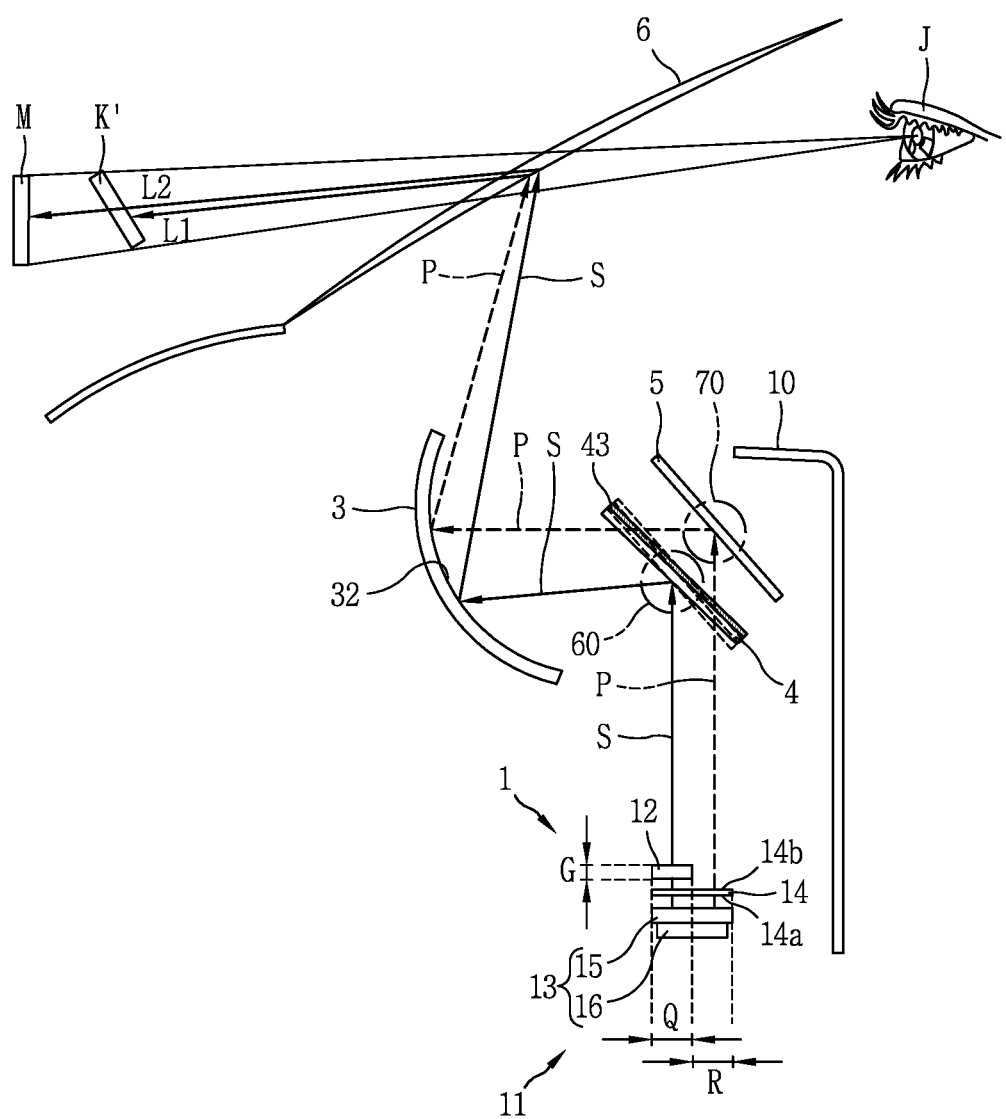
FIG. 18 is a side view in which a first virtual image is inclined during the rotation of a polarized reflective mirror in a head-up display for a vehicle for explaining the embodiments of the present disclosure.
Figure 19:
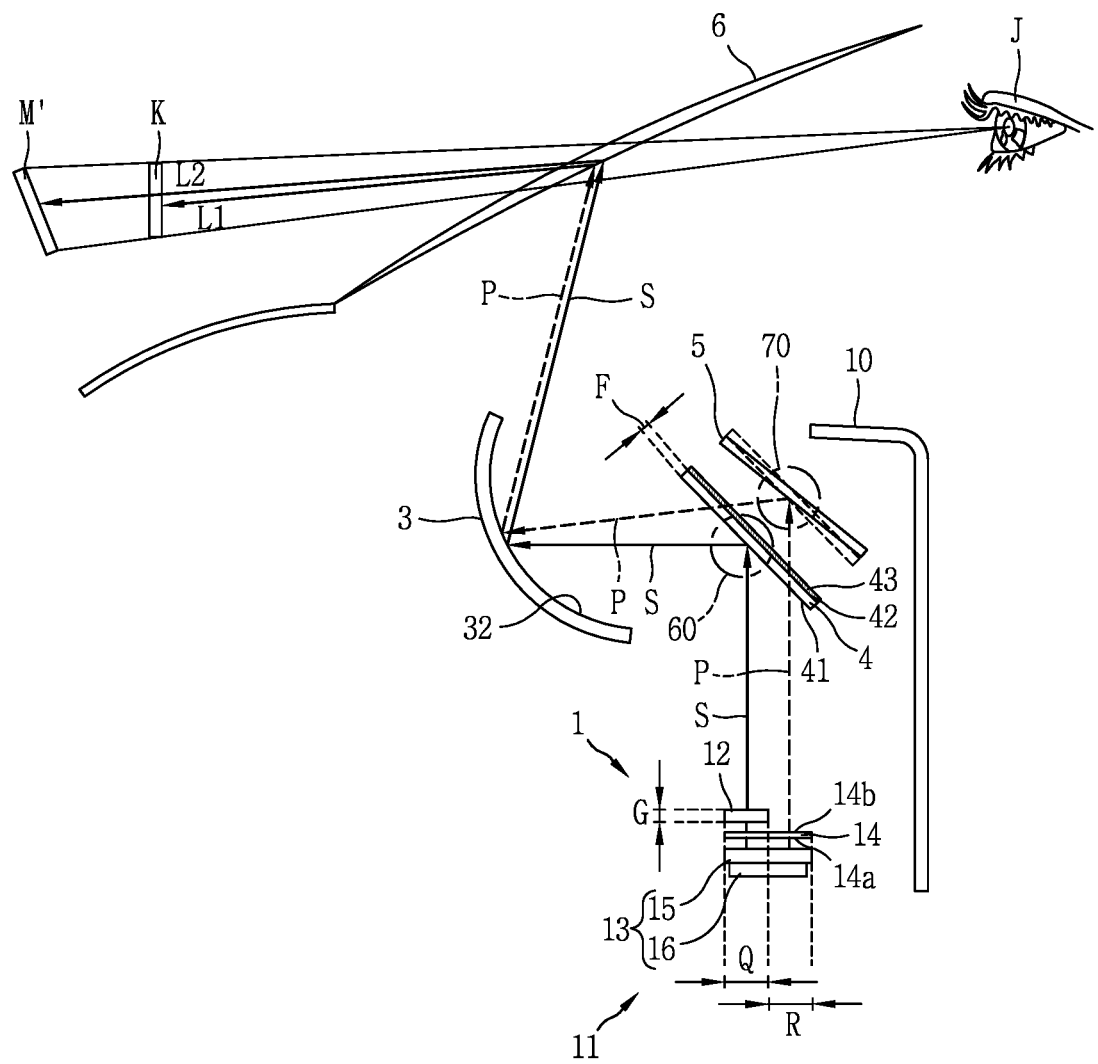
FIG. 19 is a side view in which a second virtual image is inclined during the rotation of a second reflective mirror in a head-up display for a vehicle for explaining the embodiments of the present disclosure.

FIG. 18 is a side view in which a first virtual image is inclined during the rotation of a polarized reflective mirror in a head-up display for a vehicle for explaining the embodiments of the present disclosure, and FIG. 19 is a side view in which a second virtual image is inclined during the rotation of a second reflective mirror in a head-up display for a vehicle for explaining the embodiments of the present disclosure;

The head-up display for a vehicle may further include a first rotation mechanism 60 for rotating either one of the polarized reflective mirror 4 and the second reflective mirror 5. The vehicle head-up display may further include a second rotation mechanism 70 for rotating the other of the polarized reflective mirror 4 and the second reflective mirror 5.

When the head-up display for a vehicle includes only the first rotation mechanism 60 but does not include the second rotation mechanism 70, the head-up display for a vehicle may adjust only an inclination of the first virtual image (K) but may not adjust that of the second virtual image (M). Conversely, when the head-up display for a vehicle includes only the second rotation mechanism 70 but does not include the first rotation mechanism 60, the head-up display for a vehicle may adjust only an inclination of the second virtual image (M) but may not adjust that of the first virtual image (K).

The head-up display for a vehicle may include both the first rotation mechanism 60 and second rotation mechanism 70, and in this case, it may be possible to adjust an inclination of the first virtual image (K) by the first rotation mechanism 60 and adjust an inclination of the second virtual image (M) by the second rotation mechanism 70.

Hereinafter, for the sake of convenience of explanation, an example in which the head-up display for a vehicle includes both the first rotation mechanism 60 and second rotation mechanism 70 will be described.

The first rotation mechanism 60 may be a polarized reflective mirror rotation mechanism connected to one side of the polarized reflective mirror 4 to rotate the polarized reflective mirror 4.

The first rotation mechanism 60 may include a motor, and a rotation axis of the motor may be connected to a rotation center of the polarized reflective mirror 4 to directly rotate the polarized reflective mirror 4. The second rotation mechanism 60 may include a motor and a power transmission member connected to the motor and connected to a rotating shaft of the polarized reflective mirror 4, thereby rotating the polarized reflective mirror 4 through the power transmission member.

The first rotation mechanism 60 may preferably rotate the polarized reflective mirror 4 at an angle such that the polarized reflective mirror 4 is not brought into contact with the second reflective mirror 5 during the rotation of the polarized reflective mirror 4.

The first rotation mechanism 60 may rotate the polarized reflective mirror 4 by a predetermined angle in a clockwise or counter clockwise direction, and the polarized reflective mirror 4 may be disposed to be inclined at a predetermined angle with respect to the second reflective mirror 5 in a state that the polarized reflective mirror 4 is disposed in parallel with the second reflective mirror 5 as illustrated in FIG. 18.

During the rotation of the polarized reflective mirror 4, a reflection angle of the polarized reflective mirror 4 may vary, and as illustrated in FIG. 18, the first virtual image (K') formed at a short distance (L1) from the windshield 6 may be inclined at a predetermined angle.

On the contrary, the first rotation mechanism 60 may reversely rotate the polarized reflective mirror 4 in parallel with the second reflective mirror 5, and in this case, the first virtual image (K) located at a long distance from the windshield 6 may be vertical.

The second rotation mechanism 70 may be a second reflective mirror rotation mechanism connected to one side of the second reflective mirror 5 to rotate the second reflective mirror 5.

The second rotation mechanism 70 may include a motor and a rotation axis of the motor may be connected to a rotation center of the second reflective mirror 5 to directly rotate the second reflective mirror 5. The second rotation mechanism 70 may include a motor and a power transmission member connected to the motor and connected to a rotating shaft of the second reflective mirror 5, thereby rotating the second reflective mirror 5 through the power transmission member.

The second rotation mechanism 70 may preferably rotate the second reflective mirror 5 at an angle such that the second reflective mirror 5 is not brought into contact with the polarized reflective mirror 4 during the rotation of the second reflective mirror 5.

The second rotation mechanism 70 may rotate the second reflective mirror 5 by a predetermined angle in a clockwise or counter clockwise direction, and the second reflective mirror 5 may be disposed to be inclined at a predetermined angle with respect to the polarized reflective mirror 4 in a state that the second reflective mirror 5 is disposed in parallel with the polarized reflective mirror 4 as illustrated in FIG. 19.

During the rotation (inclination change) of the second reflective mirror 5, a reflection angle of the second reflective mirror 5 may vary, and as illustrated in FIG. 19, the second virtual image (M') formed at a long distance (L2) from the windshield 6 may be inclined at a predetermined angle.

On the contrary, the second rotation mechanism 70 may reversely rotate the second reflective mirror 5 in parallel with the polarized reflective mirror 4, and in this case, the second virtual image (M) located at a long distance from the windshield 6 may be vertical.

Hereinafter, a head-up display for a vehicle capable of changing a display position, a size, a depth, a transparency (brightness), an inclination, and the like of a plurality of virtual images displayed through a windshield of the vehicle to implement augmented reality will be described.

Figure 20:
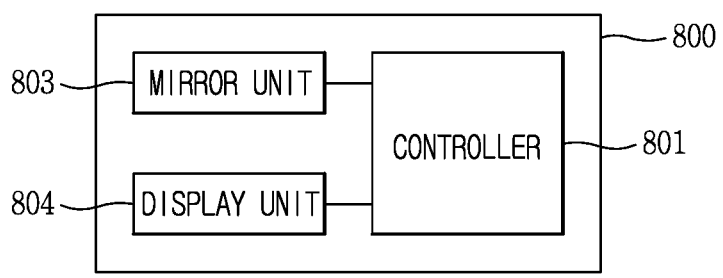
FIG. 20 is a view illustrating the configuration of a head-up display for a vehicle according to the embodiments of the present disclosure.

FIG. 20 is a view illustrating the configuration of a head-up display for a vehicle according to the embodiments of the present disclosure.

As illustrated in FIG. 20, a head-up display for a vehicle according to the embodiments of the present disclosure may include:
  a mirror unit 803 including a first mirror (first reflective mirror) 3 for reflecting first and second image lights toward a windshield of the vehicle;
  a display layer (display unit) 804 located at the windshield of the vehicle to display a first virtual image corresponding to the first image light in a first region, and display a second virtual image corresponding to the second image light in a second region; and
  a controller 801 configured to change an inclination of the first mirror to change display positions of the first and the second virtual image.

The display layer (display unit) 804 may display a first virtual image (e.g., virtual image distance of 2.5 m) corresponding to linearly-polarized light in a first direction in a first display region of the windshield of the vehicle, and display a second virtual image (e.g., virtual image distance of 7.5 m) corresponding to linearly-polarized light in a second direction in a second display region of the windshield of the vehicle.

The mirror unit 803 may include:
  an image mechanism 1 configured to emit linearly-polarized light in a first direction, and linearly-polarized light in a second direction orthogonal to the first direction;
  a first reflective mirror 3 disposed to reflect light to the windshield of the vehicle;
  a polarized reflective mirror 4 disposed to be separated from the first reflective mirror 3 so as to transmit the linearly-polarized light in the first direction, and reflect the linearly-polarized light in the second direction to the first reflective mirror 3;
  a second reflective mirror 5 disposed to be separated from the polarized reflective mirror so as to reflect the linearly-polarized light in the first direction that has transmitted through the polarized reflective mirror 4 to the first reflective mirror 3 through the first reflective mirror 3;
  a first rotation mechanism (rotation portion) 60 configured to change an inclination of the polarized reflective mirror 4.
  a second rotation mechanism (rotation portion) 70 configured to change an inclination of the second reflective mirror 5; and
  a third rotation mechanism (rotation portion) (not shown) configured to change an inclination of the first reflective mirror 3.

The first reflective mirror 3 may reflect linearly-polarized light in a first direction and linearly-polarized light in a second direction to display a first virtual image and a second virtual image on the display layer 804.

The controller 801 may adjust an inclination of the first reflective mirror 3 to change the position of the first virtual image or second virtual image.

The controller 801 may control the first rotation mechanism (driving portion) 60 and second rotation mechanism (driving portion) 70 to adjust the inclinations of the first and second virtual images. On the contrary, the controller 801 may display the inclined first and second virtual image graphics on first and second display layers without controlling the first rotation mechanism (driving portion) 60 and second rotation mechanism (driving portion) 70.

The controller 801 may change the inclination of the first reflective mirror 3 to separate the first and second virtual images from each other, change the inclination of the first reflective mirror 3 to allow the first and second virtual images to overlap with each other, or change the inclination of the first reflective mirror 3 to connect the first and second virtual images to each other.

The controller 801 may change a size, a depth, a transparency (brightness), an inclination or the like of the first and second virtual images as well as change the display positions of the first and second virtual images.

Figure 21:
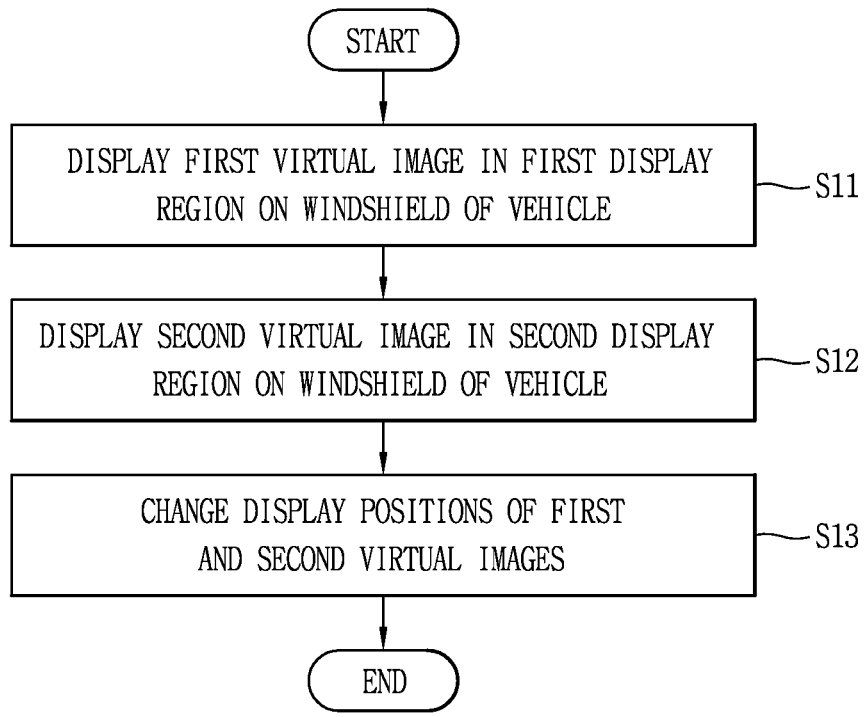
FIG. 21 is a flow chart illustrating a method of controlling a head-up display for a vehicle according to the embodiments of the present disclosure.

FIG. 21 is a flow chart illustrating a method of controlling a head-up display for a vehicle according to the embodiments of the present disclosure.

The controller 801 may reflect first image light toward the windshield of the vehicle to display a first virtual image corresponding to the first image light on a first region of the windshield of the vehicle (S11). For example, the controller 801 may display a first virtual image (e.g., virtual image distance of 2.5 m) corresponding to linearly-polarized light in the first direction on the first display region of the display layer (display unit) 804.

The controller 801 may reflect second image light toward the windshield of the vehicle to display a second virtual image corresponding to the second image light on a second region of the windshield of the vehicle (S12). For example, the controller 801 may display a second virtual image (e.g., virtual image distance of 7.5 m) corresponding to linearly-polarized light in the second direction on the second display region of the display layer (display unit) 804.

The controller 801 may change the display positions of the first and second virtual images according to the movement of an object located in front of the vehicle or a vehicle dangerous situation, a vehicle emergency situation, and the like (S13). For example, the controller 801 may change the inclination of the first reflective mirror 3 to separate the first and second virtual images from each other, change the inclination of the first reflective mirror 3 to allow the first and second virtual images to overlap with each other, or change the inclination of the first reflective mirror 3 to connect the first and second virtual images to each other.

Figure 22:
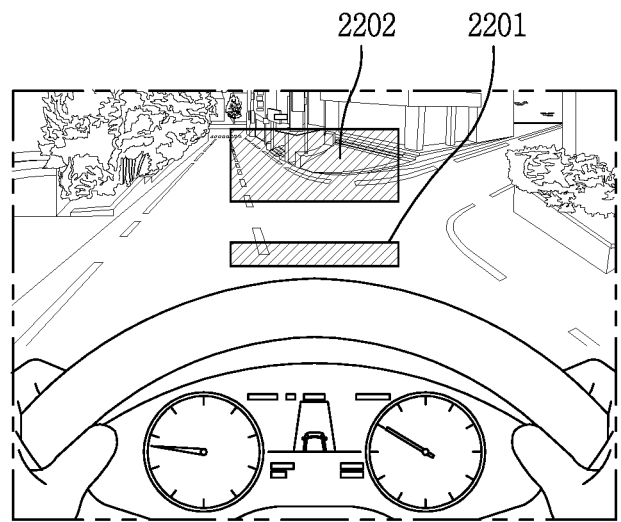
FIG. 22 is a view illustrating a method of separating first and second virtual images from each other according to the embodiments of the present disclosure.

FIG. 22 is a view illustrating a method of separating first and second virtual images from each other according to the embodiments of the present disclosure.

As illustrated in FIG. 22, the controller 801 may change the inclination of the first reflective mirror 3 to separate a first virtual image 2201 and a second virtual image 2202 from each other. The first virtual image 2201 may include a current speed of the vehicle, speed limit information, turn-by-turn (TBT) information, and the like. The second virtual image 2202 may include a graphic (e.g., a background color displayed on a traveling road, information indicating a distance to a preceding vehicle, etc.) that matches a traveling road viewed through the windshield, and the like.

The controller 801 may change information included in the first virtual image 2201 and second virtual image 2202 according to the condition of the vehicle.

Figure 23:
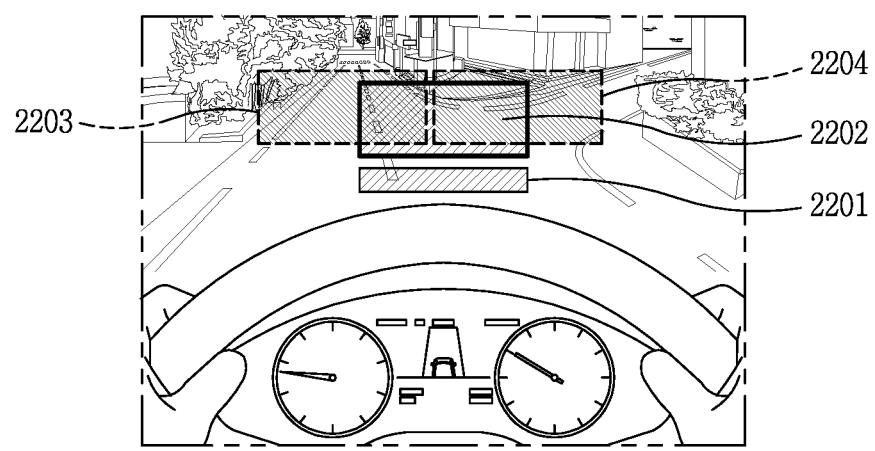
FIG. 23 is an exemplary view illustrating a method of changing a display position of the second virtual image according to the embodiments of the present disclosure.

FIG. 23 is an exemplary view illustrating a method of changing a display position of the second virtual image according to the embodiments of the present disclosure.

As illustrated in FIG. 23, the controller 801 may fix the display position of the first virtual image 2201 and change display position of the second virtual image 2202 to display the second virtual image 2202 in a third display region 2203 or fourth display region 2204. For example, the controller 801 may change the inclination of the first reflective mirror 3 to display the second virtual image 2202 in the third display area 2203 or fourth display area 2204. For example, the controller 801 may fix the display position of the first virtual image 2201, and change the inclination of the first reflection mirror 3 to move the second virtual image 2202 to the left or right. The controller 801 may fix the display position of the first virtual image 2201 and change the inclination of the first reflective mirror 3 to move the second virtual image 2202 upward or downward.

Figure 24:
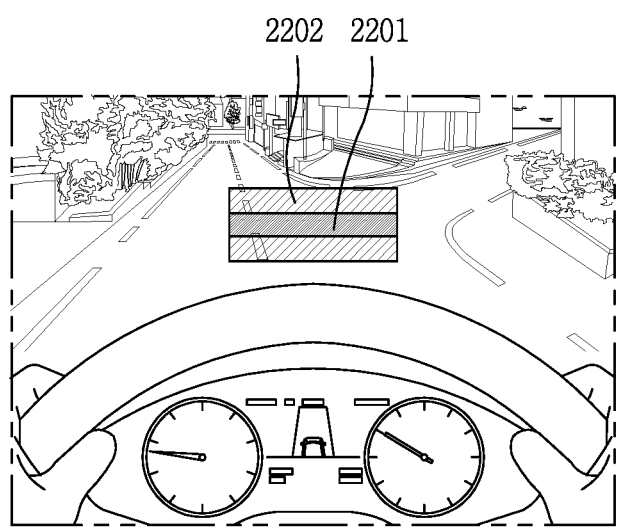
FIG. 24 is an exemplary view illustrating a method of allowing the first virtual image and the second virtual image to overlap according to the embodiments of the present disclosure.

FIG. 24 is an exemplary view illustrating a method of allowing the first virtual image and the second virtual image to overlap according to the embodiments of the present disclosure.

As illustrated in FIG. 24, the controller 801 may move the second virtual image 2202 to the display position of the first virtual image 2201 or move the first virtual image 2201 to the display position of the second virtual image 2202 to allow the first virtual image 2201 and second virtual image 2202 to overlap with each other. For example, the controller 801 may change the inclination of the first reflective mirror 3 to allow the first virtual image 2201 and second virtual image 2202 overlap with each other. For example, the controller 801 may fix the display position of the first virtual image 2201, and change the inclination of the first reflective mirror 3 to move the second virtual image 2202 to the display position of the first virtual image 2201, thereby allowing the first virtual image 2201 and second virtual image 2202 to overlap with each other.

FIG. 25 through 28 are exemplary views illustrating a method of informing a user of the possibility of a collision with a preceding vehicle using the first and second virtual images according to the embodiments of the present disclosure.

Figure 25:
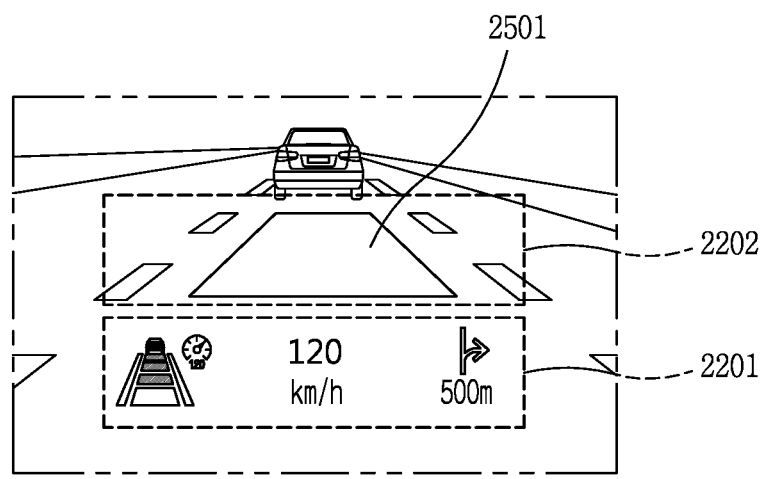
FIG. 25 through 28 are exemplary views illustrating a method of informing a user of the possibility of a collision with a preceding vehicle using the first and second virtual images according to the embodiments of the present disclosure.

As illustrated in FIG. 25, the controller 801 may display the first virtual image 2201 including basic information such as a vehicle speed, a vehicle traveling direction, and an amount of fuel injection in the first display region, and display the second virtual image 2202 including a graphic object 2501 matching a road is displayed in the second display region.

Figure 26:
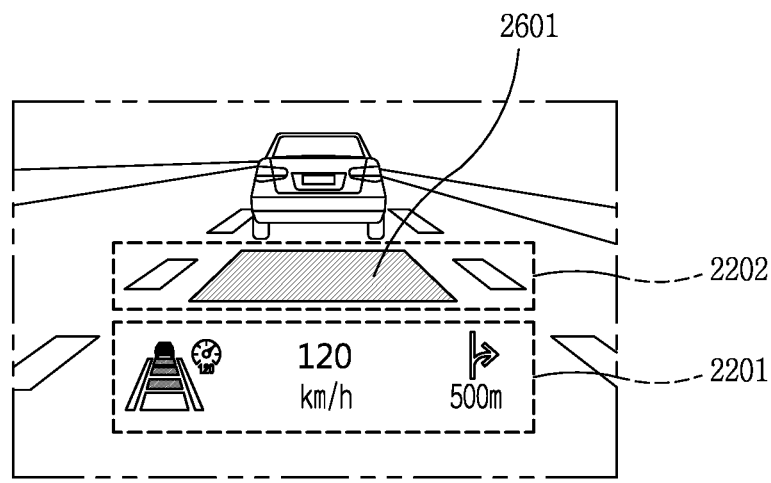

As illustrated in FIG. 26, when a distance from the preceding vehicle decreases, the controller 801 may reduce a length of the graphic object indicating the distance to the preceding vehicle, and change a color of the graphic object 2601 at the same time.

Figure 27:
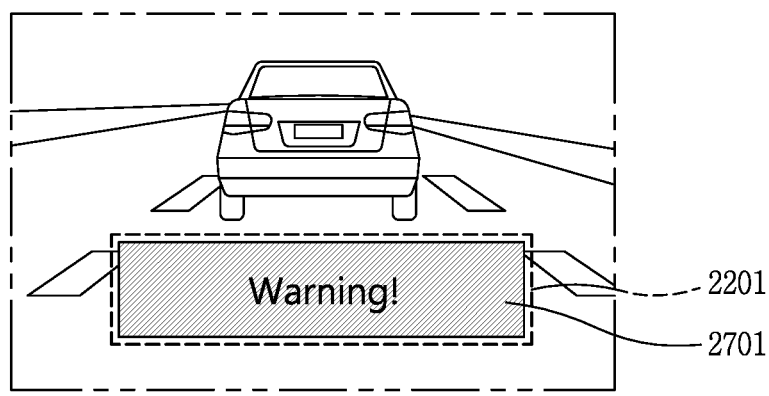

As illustrated in FIG. 27, when a distance from the preceding vehicle is less than a reference distance (distance-to-collision), the controller 801 may allow the first virtual image 2201 and second virtual image 2202 to overlap with each other, and display collision warning information (a collision warning image, a collision warning text, etc.) 2701 on the overlapped first virtual image 2201 and/or second virtual image 2202.

Figure 28:
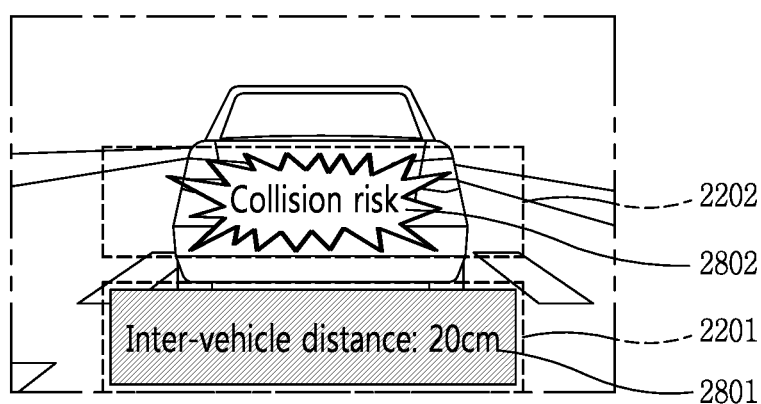

As illustrated in FIG. 28, when a distance from the preceding vehicle is less than a reference distance (distance-to-collision), the controller 801 may display an inter-vehicle distance 2801 on the first virtual image 2201, and display collision risk information (a collision risk image, a collision risk text, etc.) 2802 on the second virtual image 2202. In other words, the controller 801 may change the display positions of the first virtual image 2201 and second virtual image 2202 according to a distance (inter-vehicle distance) to the preceding vehicle, and change information displayed on the first virtual image 2201 and second virtual image 2202.

The controller 801 may display the second virtual image 2202 including a graphic object overlapping with an object having a possibility of collision with the vehicle in the second display region. For example, the controller 801 may decrease an inclination angle of the graphic object while at the same changing the color of the graphic object as the probability of collision with the vehicle is lower (as the distance from the object increases).

The controller 801 may increase an inclination angle of the graphic object (gradually raises up the graphic object) while at the same changing a color of the graphic object as the probability of collision with the vehicle is higher (as the distance from the object decreases).

The controller 801 may display the possibility of collision in a different manner while changing an angle (e.g., vertical, horizontal) of the graphic object (image) indicating a distance to the preceding vehicle (inter-vehicle distance).

The controller 801 may allow the first virtual image 2201 and second virtual image 2202 to completely overlap when a distance to the preceding vehicle (inter-vehicle distance) is less than a reference distance (distance-to-collision).

Accordingly, the head-up display for a vehicle according to the embodiments of the present disclosure may provide a driver with a virtual barrier in a three-dimensional manner through the inclination of the graphic object, thereby lowering the incidence of vehicle accidents and providing a more effective collision alert interface.

Figure 29:
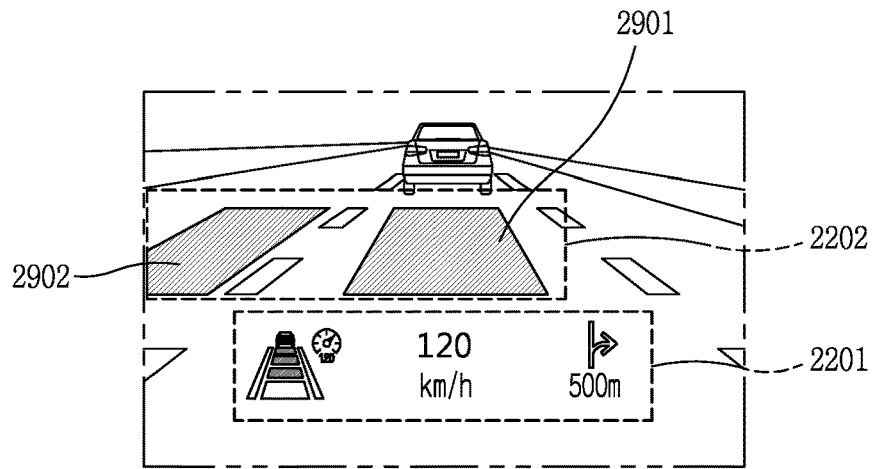
FIG. 29 is an exemplary view illustrating information displayed on the second virtual image according to the embodiments of the present disclosure.

FIG. 29 is an exemplary view illustrating information displayed on the second virtual image according to the embodiments of the present disclosure.

As illustrated in FIG. 29, the controller 801 may display a first graphic object (first image) 2901 matching a road on which the vehicle is currently traveling and indicating an inter-vehicle distance in a first region of the second virtual image, and display a second graphic object (second image) 2902 matching a road corresponding to a lane to be changed when changing a traveling lane according to the intention of the driver (e.g., when a left turn signal lamp is turned on)) and indicating an inter-vehicle distance of the lane to be changed in a second region of the second virtual image.

When changing a traveling lane to the right or left lane, the controller 801 may display a graphic object 2902 indicating a possibility of collision with a vehicle traveling in the lane to be changed in the second region of the second virtual image. For example, when changing the traveling lane to the left lane, the controller 801 may display the graphic object 2902 indicating a distance to an adjacent vehicle traveling in the left lane to be changed in the second region of the second virtual image. The controller 801 may display a background color of the graphic object 2902 in a first color (e.g., blue) when a distance from the adjacent vehicle traveling in the left lane to be changed is greater than a reference distance (distance-to-vehicle collision), and display the background color of the graphic object 2902 in a second color (e.g., red) when a distance from the adjacent vehicle traveling in the left lane to be changed is less than a reference distance (distance-to-vehicle collision).

In other words, the controller 801 may display the first graphic object 2901 matching a current traveling road and indicating an inter-vehicle distance on the current traveling road in the first region of the second virtual image 2202, and display the second graphic object 2902 matching an adjacent road corresponding to the traveling lane to be changed and indicating a distance-to-vehicle on the adjacent road in the second region of the second virtual image 2202 when a traveling lane change is requested.

FIGS. 30 through 33 are exemplary views illustrating a method of displaying information displayed on the first and second virtual images in different ways when a vehicle cuts off according to the embodiments of the present disclosure.

Figure 30:
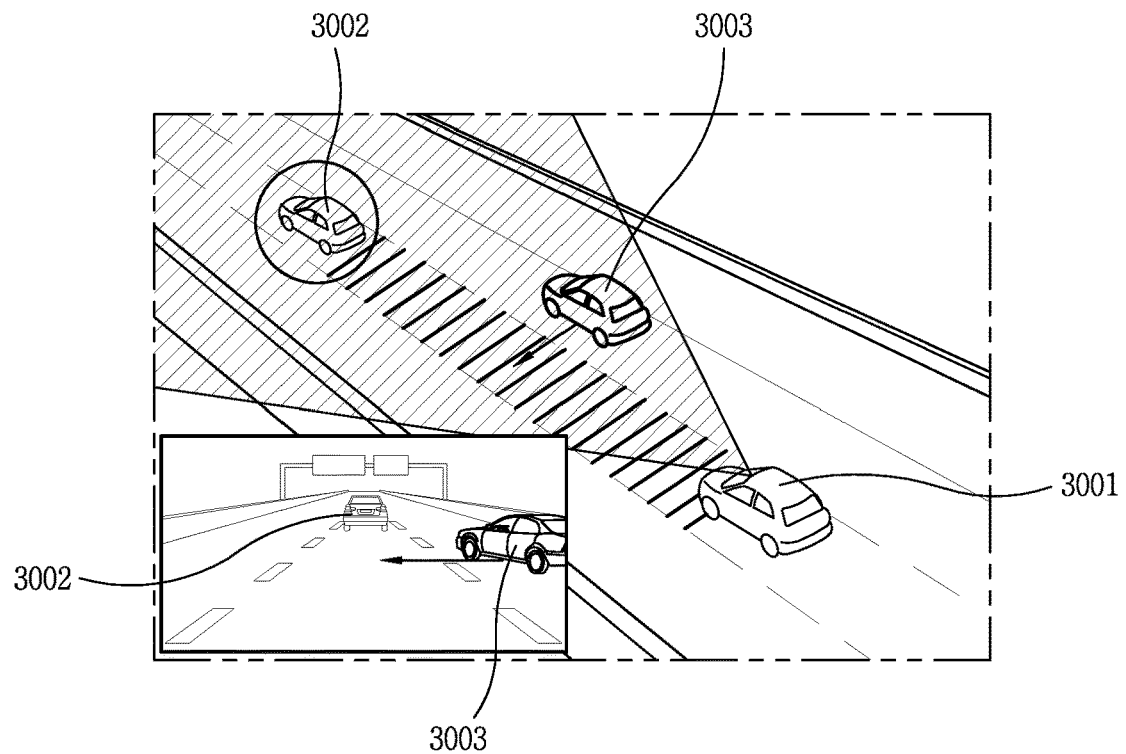
FIGS. 30 through 33 are exemplary views illustrating a method of displaying information displayed on the first and second virtual images in different ways according to a cutting-off vehicle according to the embodiments of the present disclosure.
Figure 31:
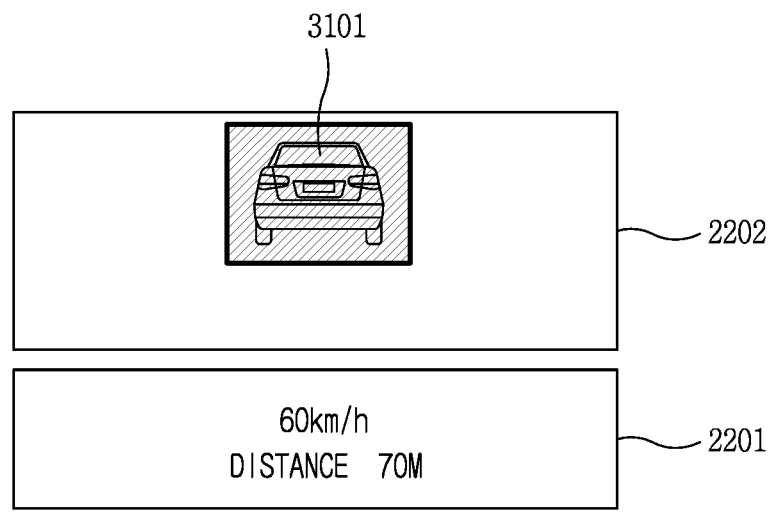

As illustrated in FIGS. 30 and 31, when a vehicle 3001 performs active cruise control (ACC) to autonomously travel along a target vehicle 3002, the controller 801 may display a vehicle speed, an inter-vehicle distance, and the like on the first virtual image 2201, and display a graphic object 3101 overlapping with the target vehicle 3002 in the second virtual image 2202.

The controller 801 may change the color, shape, blinking and the like of the graphic object 3101 overlapping with the target vehicle 3002 according to a distance from the target vehicle 3002.

Figure 32:
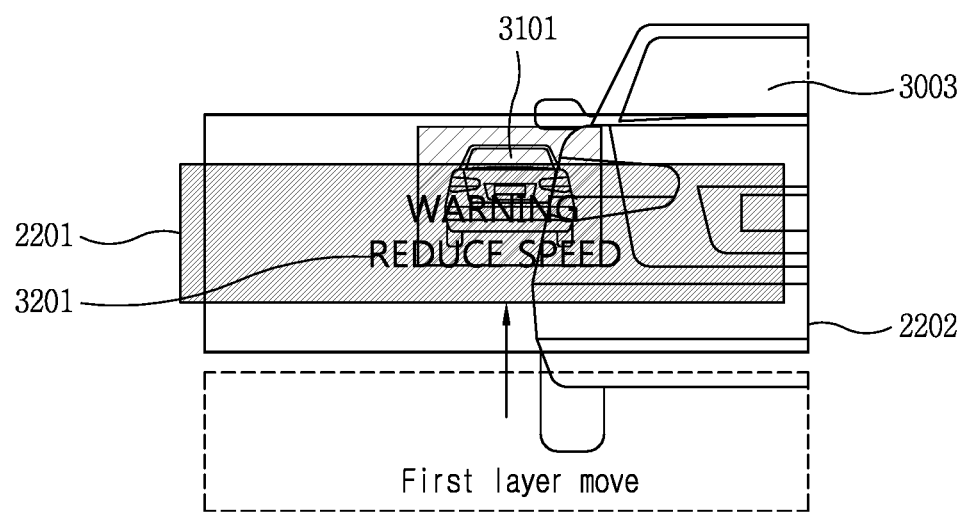

As illustrated in FIG. 32, when another vehicle 3003 suddenly cuts off between the vehicle 3001 and the target vehicle 3002 (e.g., when a distance between the vehicle 3001 and the another vehicle 3003 is less than a first virtual image distance (e.g., 2.5 meters) while the vehicle 3001 performs active cruise control (ACC) to autonomously travel along the target vehicle 3002, the controller 801 may change the display position of the first virtual image 2201 so as to allow the first virtual image 2201 to overlap with the another vehicle 3002, and display information 3201 indicating a possibility of collision with the another vehicle 3003 on the first virtual image 2201 without displaying a vehicle speed, an inter-vehicle distance and the like on the first virtual image 2201. When displaying the information 3201 indicating a possibility of collision with the another vehicle 3003 on the first virtual image 2201, the controller 801 may temporarily delete information displayed on the virtual image 2202 or decrease the brightness. For example, when the another vehicle 3003 suddenly cuts off at a distance of 2.5 meters or less while a driver is viewing the second virtual image (e.g., virtual image distance of 7.5 m) while driving, the controller 801 may allow the first virtual image (e.g., virtual image distance of 2.5 m) to overlap with the another vehicle 3003, and display the information 3201 indicating the possibility of collision with the another vehicle 3003 on the first virtual image 2201.

In other words, the controller 801 may change the display position of the first virtual image 2201 to allow the first virtual image 2201 to overlap with the first vehicle 3003 when the first vehicle (another vehicle) 3003 enters between the vehicle 3001 and the preceding vehicle 3002, and a distance between the vehicle 3001 and the first vehicle 3003 is less than a reference distance (e.g., 2.5 m), and change the display position of the second virtual image 2202 to allow the second virtual image 2202 to overlap with the first vehicle 3003 when a distance between the vehicle 3001 and the first vehicle 3003 exceeds a reference distance (e.g., 2.5 m).

Figure 33:
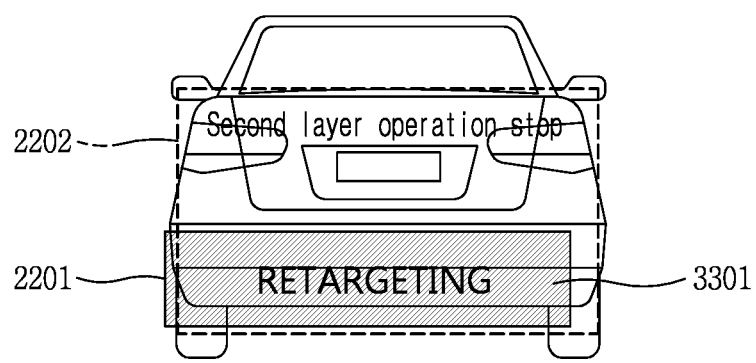

As illustrated in FIG. 33, when another vehicle 3003 suddenly cuts off between the vehicle 3001 and the target vehicle 3002 (e.g., when a distance between the vehicle 3001 and the another vehicle 3003 is less than a first virtual image distance (e.g., 2.5 meters) while the vehicle 3001 performs active cruise control (ACC) to autonomously travel along the target vehicle 3002, the controller 801 may change the display position of the first virtual image 2201 so as to allow the first virtual image 2201 to overlap with the another vehicle 3002, and display information 3201 indicating a possibility of collision with the another vehicle 3003 on the first virtual image 2201 without displaying a vehicle speed, an inter-vehicle distance and the like on the first virtual image 2201. Then, the controller 801 may display information (e.g., a text, a virtual barrier, an arrow, etc.) 3201 indicating a possibility of collision with the another vehicle 3003 on the first virtual image 2201, and then recognize the another vehicle 3003 as a new target vehicle to autonomously travel along the another vehicle 3003.

The controller 801 may generate notification information indicating that the another vehicle 3003 has been changed to a new target vehicle and display the notification information 3301 on the first virtual image 2201.

The controller 801 may display a distance to the another vehicle 3003, a speed, and whether or not the another vehicle 3003 is appropriate for a target vehicle according to the execution of active cruise control (ACC) as an icon, a number, a color, and the like on the first virtual image 2201.

When a speed change rate of the another vehicle 3003 is less than a reference value, and a speed difference between the another vehicle 3003 and a surrounding vehicle is less than a reference value, the controller 801 may determine the another vehicle 3003 as a target vehicle according to the execution of active cruise control (ACC).

When the visibility of the first virtual image 2201 and second virtual image 2202 is reduced by a lamp (e.g., headlight) at night, the controller 801 may move the display positions of the first virtual image 2201 and second virtual image 2202 (e.g., moving the display positions thereof to the top of the windshield) to enhance the visibility of the first virtual image 2201 and second virtual image 2202 by the lamp (e.g., headlight).

Figure 34:
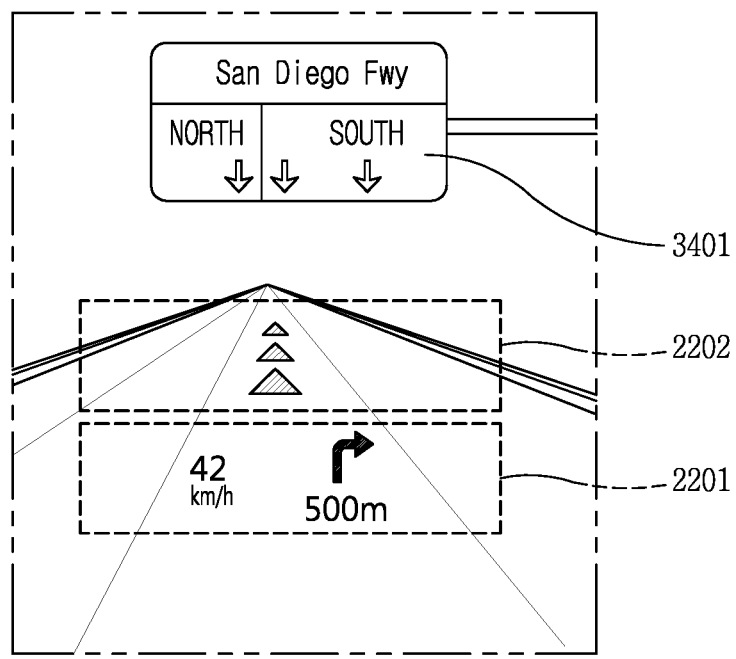
FIGS. 34 and 35 are exemplary views illustrating a method of changing an inclination of the second virtual image according to the embodiments of the present disclosure.
Figure 35:
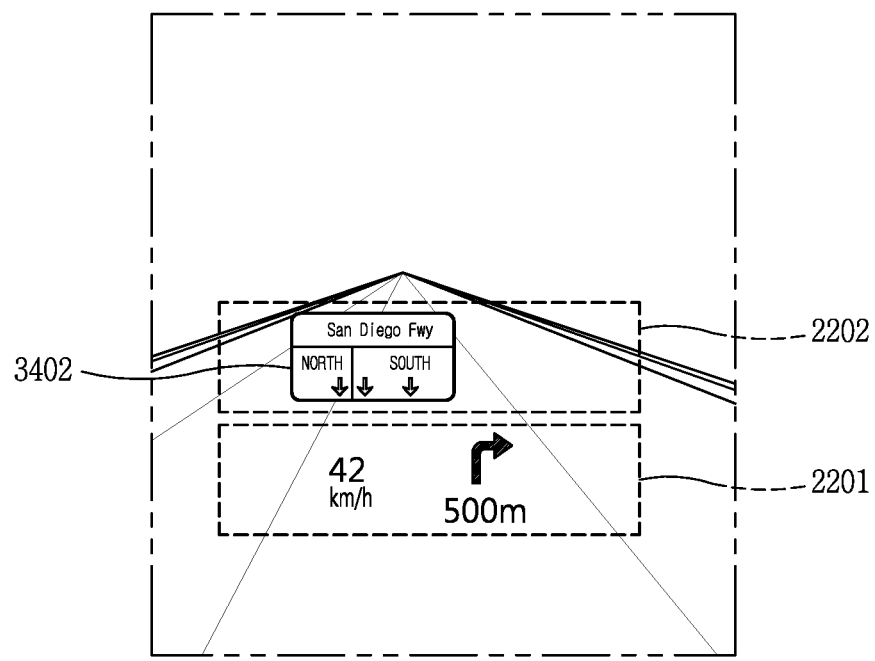

FIGS. 34 and 35 are exemplary views illustrating a method of changing an inclination of the second virtual image according to the embodiments of the present disclosure.

As illustrated in FIGS. 34 and 35, when gformation (e.g., milestones, various signs, etc.) 3401 located at a traveling road while driving the traveling road is detected by the camera 310, the controller 801 may display the detected road guide information on the second virtual image 2202.

As illustrated in FIG. 35, when the road guide information (e.g., milestones, various signs, etc.) 3401 located at a traveling road while driving the traveling road is detected by the camera 310, the controller 801 may change an inclination of an image 3402 corresponding to the road guide information to allow the image 3402 corresponding to the detected road guide information to be vertical. For example, when displaying a milestone image 3402 corresponding to a milestone 3401 located in the vicinity on the second virtual image 2202, the controller 801 may incline the milestone image 3402 at an angle close to +90 degrees with respect to the direction of gravity. In other words, the controller 801 may change an inclination of the second virtual image 2202 such that the second virtual image 2202 is closer to the direction of gravity as a distance between the milestone 3401 and the vehicle 3301 decreases. On the contrary, the controller 801 may change the inclination of the second virtual image 2202 to an original state (inclination of zero degrees) such that the second virtual image 2202 approaches a horizontal direction as a distance between the milestone 3401 and the vehicle 3301 increases.

In other words, the controller 801 may gradually raise up the milestone image 3402 displayed on the second virtual image 2202 as a distance between the milestone 3401 and the vehicle 3301 decreases, and gradually lay down the milestone image 3402 displayed on the second virtual image 2202 as a distance between the milestone 3401 and the vehicle 3301 increases, thereby allowing a driver to intuitively check whether a distance between the milestone 3401 and the vehicle 3301 decreases or increases.

Figure 36:
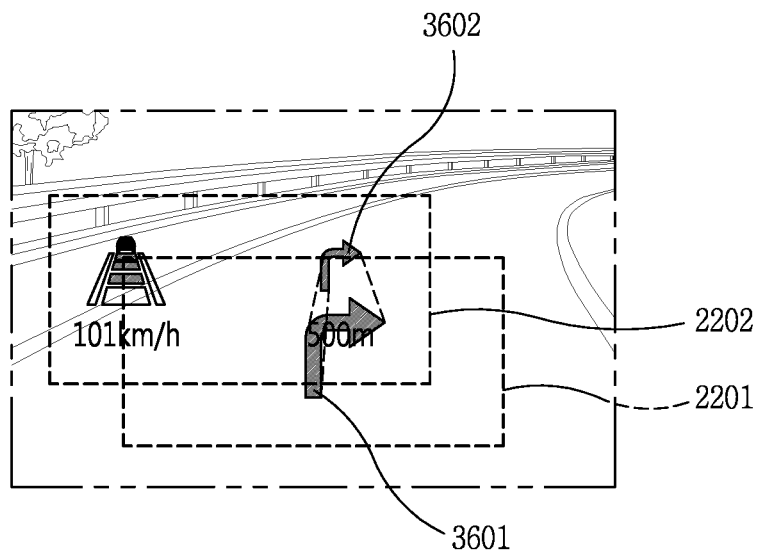
FIGS. 36 and 37 are illustrations illustrating a method of allowing the first and second virtual images to overlap so as to display a stereoscopic image according to embodiments of the present disclosure.
Figure 37:
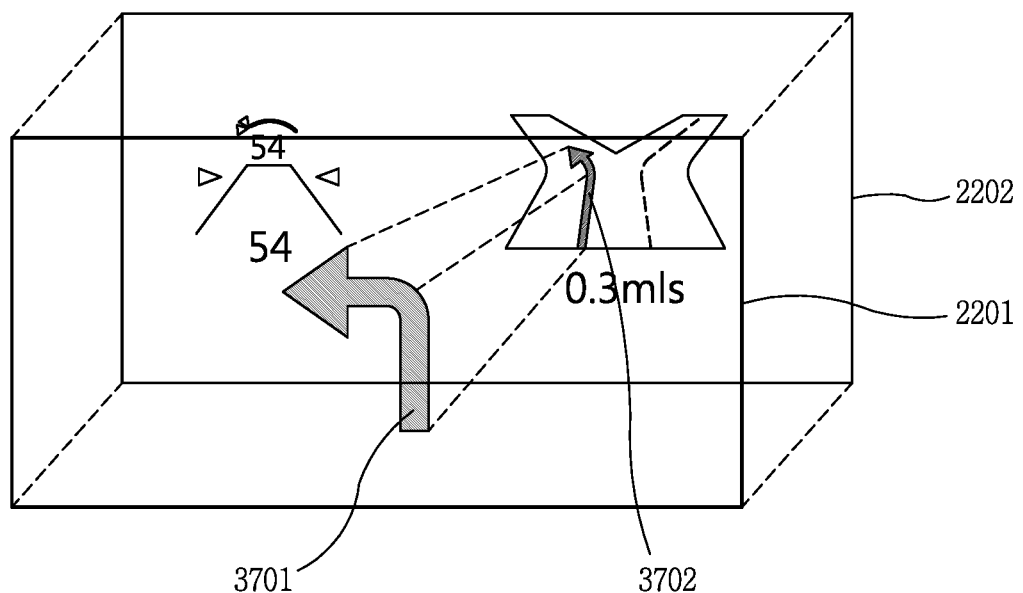

FIGS. 36 and 37 are illustrations illustrating a method of allowing the first and second virtual images to overlap so as to display a stereoscopic image according to embodiments of the present disclosure.

As illustrated in FIGS. 36 and 37, when an urgent situation or important notification is required while displaying basic information such as a vehicle speed, a vehicle traveling direction, and an amount of fuel injection on the first virtual image 2201, and displaying a graphic object indicating a distance from the preceding vehicle, and the like, the controller 801 may allow the first and the second virtual image to overlap to exhibit a stereoscopic image. For example, when turn-by-turn information should be displayed while displaying basic information such as a vehicle speed, a vehicle traveling direction, and an amount of fuel injection on the first virtual image 2201, and displaying a graphic object indicating a distance from the preceding vehicle, and the like on the second virtual image 2202, the controller 801 may track a driver's line of sight using an "eye tracking" technique in the vehicle, and change the sizes and display positions of first turn-by-turn image 3601, 3701 and second turn-by-turn image 3602, 3702 to allow the tracked driver's line of sight to match the first turn-by-turn image 3601, 3701 displayed on the first virtual image 2201 and the second turn-by-turn image 3602, 3702 displayed on the second virtual image 2202 with each other.

In other words, the controller 801 may change the sizes and display positions of the first turn-by-turn image 3601 and second turn-by-turn image 3602 to allow a driver to view the first turn-by-turn image 3601, 3701 displayed on the first virtual image 2201 and the second turn-by-turn image 3602, 3702 displayed on the second virtual image 2202 in a three dimensional perspective. The controller 801 may track the driver's line of sight using the above "eye tracking" technique for line-of-sight matching between the first virtual image 2201 and the corresponding second virtual image 2202.

In order to effectively inform a vehicle traveling direction at an exit or entrance road portion, the controller 801 may allow the first and second virtual images to overlap so as to display a stereoscopic image. For example, the controller 801 may display different images on the first and second virtual images, respectively, and then display a first portion of one image on the first virtual image 2201 when a predetermined condition is satisfied, and display a second portion of the one image of the first virtual image 2201 on the second virtual image 2202, thereby producing an effect of connecting the first virtual image 2201 and second virtual image 2202 to each other. The predetermined condition denotes when a porthole is detected, a water puddle is detected, a lane at an intersection is changed, or a possibility of vehicle collision occurs.

Figure 38:
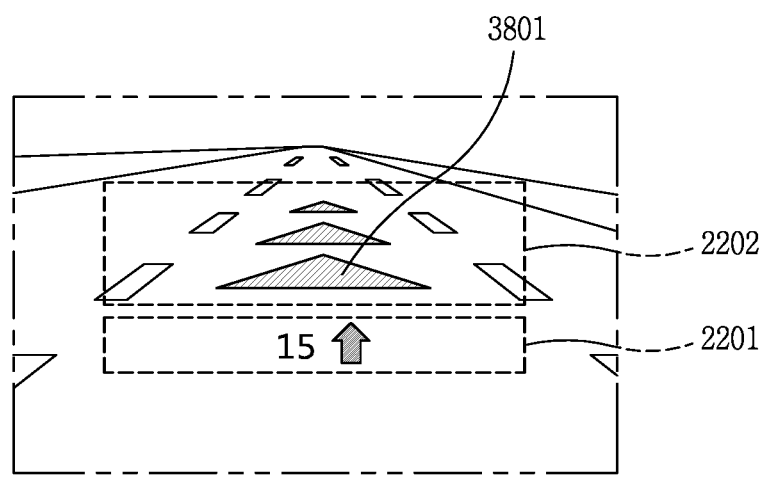
FIG. 38 is an exemplary view illustrating another method of allowing the first and second virtual images to overlap so as to display a stereoscopic image according to embodiments of the present disclosure.
Figure 38:
Figure 38:
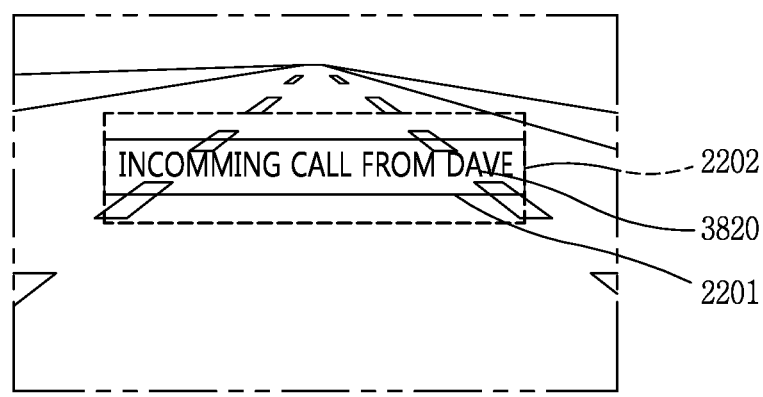

FIG. 38 is an exemplary view illustrating another method of allowing the first and second virtual images to overlap so as to display a stereoscopic image according to embodiments of the present disclosure.

As illustrated in FIG. 38, when an urgent situation or important notification is required while displaying basic information such as a vehicle speed, a vehicle traveling direction, and an amount of fuel injection on the first virtual image 2201, and displaying a graphic object indicating a distance from the preceding vehicle, and the like, the controller 801 may allow the first and the second virtual image to overlap to exhibit a stereoscopic image. For example, when a call signal is received while displaying basic information such as a vehicle speed, a vehicle traveling direction, and an amount of fuel injection on the first virtual image 2201, and displaying a graphic object 3801 indicating a distance from the preceding vehicle, and the like on the second virtual image 2202, the controller 801 may allow the first virtual image 2201 and second virtual image 2202 to overlap, and display notification information 3820 for notifying that the call signal has been received in a three-dimensional perspective.

For example, when the call signal is received, the controller 801 may move the first virtual image 2201 to the second virtual image 2202 corresponding to a driver's field-of-view position to allow the first virtual image 2201 and second virtual image 2202 overlap, and display the notification information 3820 for notifying that the call signal has been received on the first virtual image while at the same dimming the brightness of the second virtual image 2202, increasing the transparency of the second virtual image 2202, and displaying the second virtual image 2202 in a dark color, thereby displaying the notification information 3820 in a three dimensional perspective.

Figure 39:
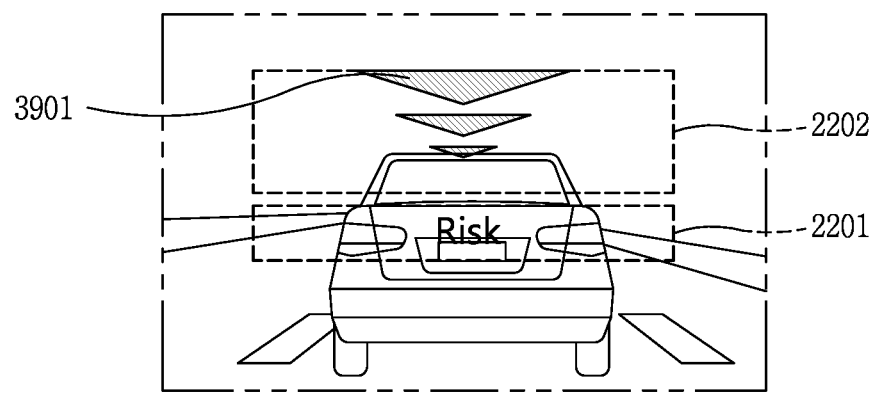
FIG. 39 is an exemplary view illustrating a method of changing information displayed on the first and second images based on important notification information according to the embodiments of the present disclosure.

FIG. 39 is an exemplary view illustrating a method of changing information displayed on the first and second images based on important notification information according to the embodiments of the present disclosure.

As illustrated in FIG. 39, when a distance (inter-vehicle distance) to a cutting-off vehicle is less than a reference distance (e.g., 2.5 m) while displaying basic information such as a vehicle speed and an amount of fuel injection on the first virtual image 2201, and displaying a graphic object indicating a distance to the preceding vehicle or a vehicle traveling direction on the second virtual image, the controller 801 may display collision risk information (important notification information) on the first virtual image 2201, change the display position of the second virtual image 2202 to block the virtual image 2202 and the cutting-off vehicle from overlapping, and display a graphic image indicating a distance to the preceding vehicle or a vehicle traveling direction on the second virtual image 2202 on the changed display position. Accordingly, it may be possible to solve a problem in which the cutting-off vehicle is hidden by the graphic object displayed on the second virtual image 2202.

Figure 40:
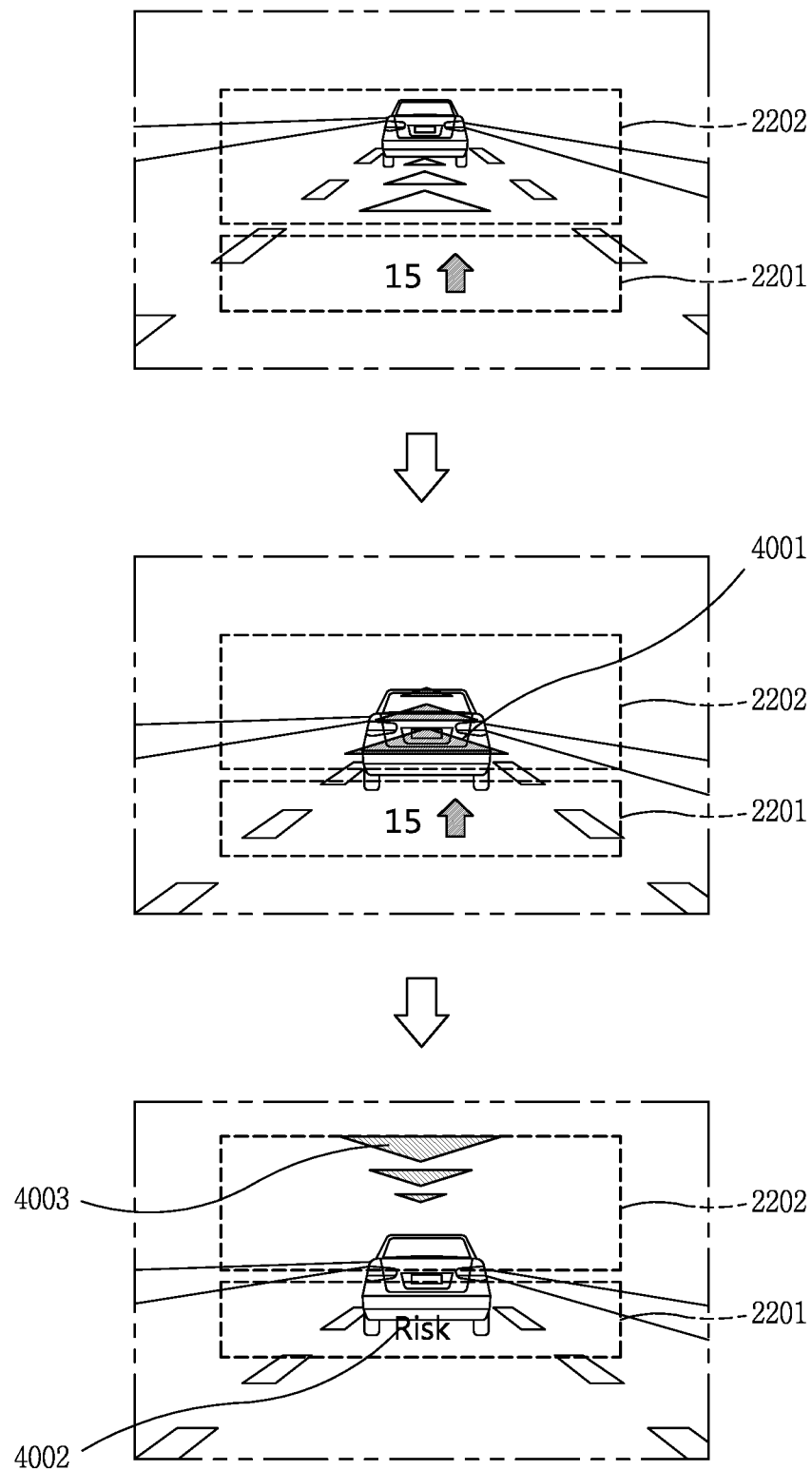
FIG. 40 is an exemplary view illustrating a method of changing information displayed on the first and second virtual images based on an obstacle according to the embodiments of the present disclosure.

FIG. 40 is an exemplary view illustrating a method of changing information displayed on the first and second virtual images based on an obstacle according to the embodiments of the present disclosure.

As illustrated in FIG. 40, the controller 801 may display basic information such as a vehicle speed and an amount of fuel injection on the first virtual image 2201, and when a distance (inter-vehicle distance) to a cutting-off vehicle is less than a reference distance (e.g., 2.5 m) while displaying a graphic object indicating a distance to the preceding vehicle or a vehicle traveling direction on the second virtual image, the graphic object 4001 may overlap with the preceding vehicle, and it may be difficult for a driver to recognize the preceding vehicle. Accordingly, when a distance (inter-vehicle distance) to the preceding vehicle is less than a reference distance (e.g., 2.5 m), the controller 801 may display collision risk information (important notification information) on the first virtual image 2201, and change the display position of the second virtual image 2202 to disallow the virtual image 2202 and the preceding vehicle to overlap with each other while at the same changing the display position of a graphic image 4003 indicating a distance to the preceding vehicle or a vehicle traveling direction on the second virtual image 2202 on which the display position thereof is changed. Accordingly, it may be possible to solve a problem in which the preceding vehicle is hidden by the graphic object displayed on the second virtual image 2202.

Figure 41:
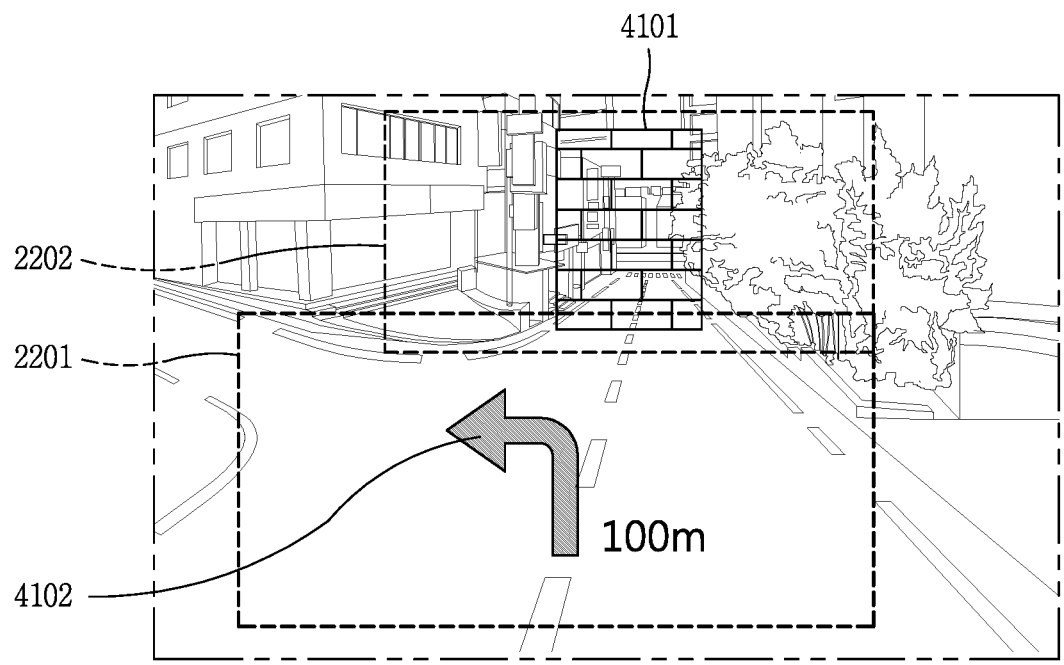
FIG. 41 is an exemplary view illustrating a method of providing road guide information based on the first and second virtual images according to the embodiments of the present disclosure.

FIG. 41 is an exemplary view illustrating a method of providing road guide information based on the first and second virtual images according to the embodiments of the present disclosure.

As illustrated in FIG. 41, when road guide information (turn-by-turn information) is displayed on a road that should be entered at a current position while displaying basic information such as a vehicle speed and an amount of fuel injection on the first virtual image 2201, and displaying a graphic object indicating a distance to the preceding vehicle or a vehicle traveling direction as the second virtual image 2202, the controller 801 may display road guide information (turn-by-turn information) 4102 on the first virtual image 2201 while at the same displaying a virtual wall matching a road that should not be entered (e.g., a graphic object indicating a road that should not be entered) 4101 on the second virtual image 2202. For example, as the position of the vehicle approaches the position of turn-by-turn (TBT), the controller 801 may gradually tilt the turn-by-turn (TBT) image 4102 displayed on the first virtual image 2201 (as if a door is opened) while at the same gradually raising up the virtual wall 4101 displayed on the second virtual image 2202 on the road that should not be entered, thereby allowing a driver quickly and intuitively confirm whether or not it is an entry road.

In other words, the controller 801 may gradually raise up a graphic object 4101 that matches a road the vehicle should not enter as the vehicle approaches a current intersection, and gradually lay down an image 4102 corresponding to the road guide information displayed on the first virtual image 2201 as the vehicle approaches the current intersection.

Figure 42:
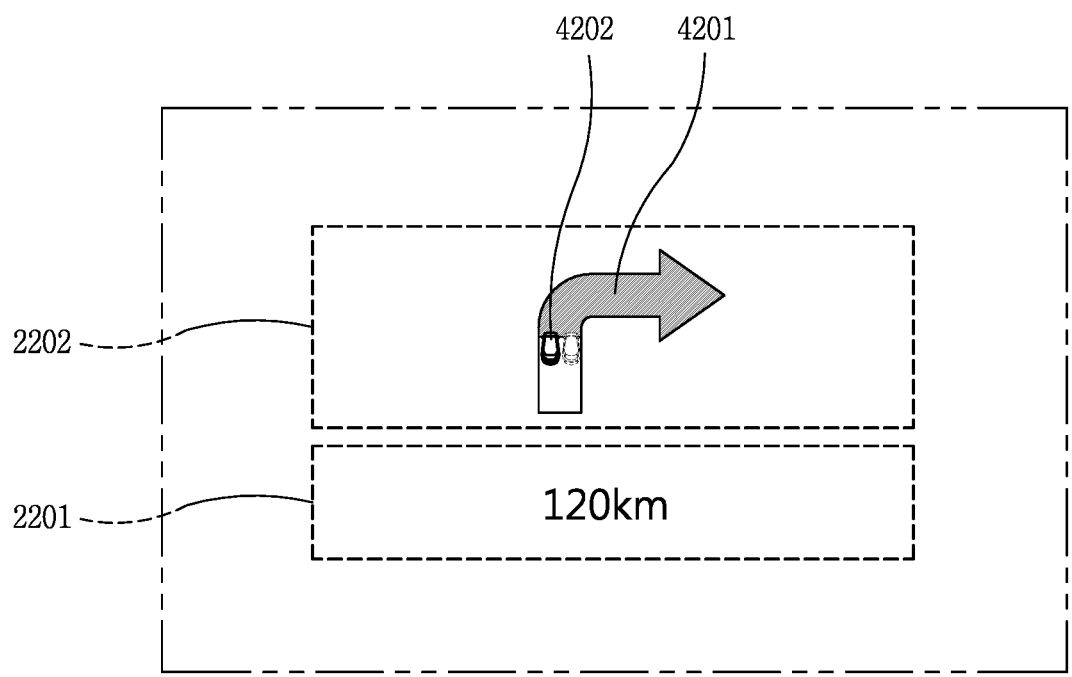
FIG. 42 is an exemplary view illustrating a method of displaying road guide information on the first and/or the second virtual image according to the embodiments of the present disclosure.

FIG. 42 is an exemplary view illustrating a method of displaying road guide information on the first and/or the second virtual image according to the embodiments of the present disclosure.

As illustrated in FIG. 42, the controller 801 may display basic information such as a vehicle speed and an amount of fuel injection on the first virtual image 2201, and when a vehicle speed is high enough to cause a vehicle to be pushed when cornering, the controller 801 may display a turn-by-turn image 4201 on the second virtual image 2202 while at the same displaying an image 4202 indicating that the vehicle can be pushed to the right or left the turn-by-turn image 4201, and gradually change a background color of the turn-by-turn image 4201.

For example, when a current speed of the vehicle exceeds a vehicle entry reference speed of a cornering section while displaying the current speed of the vehicle on the first virtual image 2201 and the turn-by-turn image 4201 indicating the cornering section on the second virtual image 2202, the controller 801 may display an image 4202 indicating that the vehicle can understeer (a phenomenon that the vehicle is pushed to the right or left when cornering) on the turn-by-turn image (4201). The vehicle entry reference speed may indicate a speed at which the vehicle is pushed to the right or left when cornering, and may be changed according to the designer or the user's intention.

Figure 43:
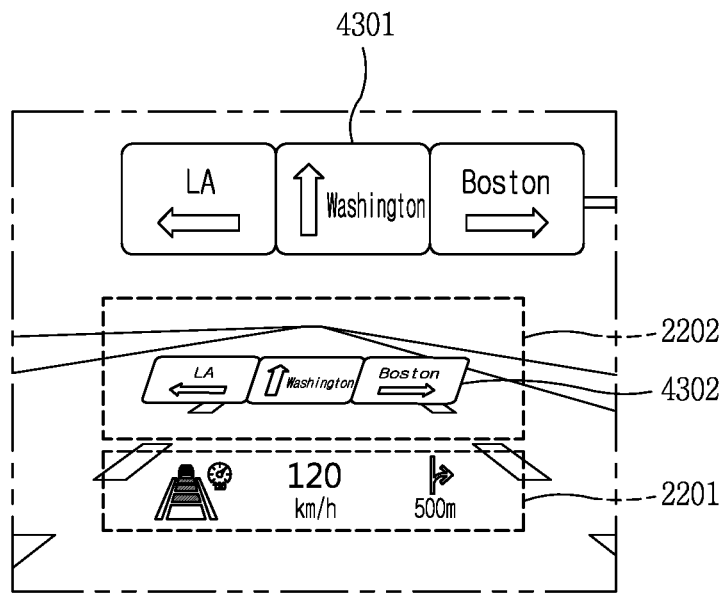
FIGS. 43 and 44 are other exemplary views illustrating a method of displaying road guide information on the second virtual image according to the embodiments of the present disclosure.
Figure 44:
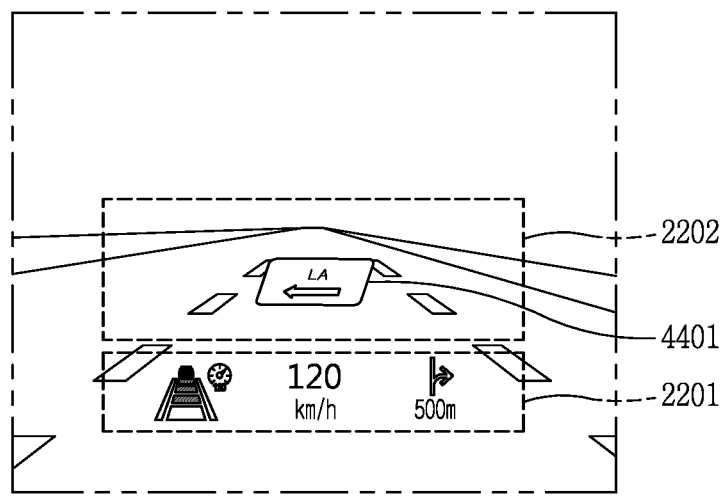

FIGS. 43 and 44 are other exemplary views illustrating a method of displaying road guide information on the second virtual image according to the embodiments of the present disclosure.

As illustrated in FIG. 43, when the camera 310 detects road guide information (e.g., milestones, various signs, etc.) 4301 located at a traveling road while traveling on the traveling road, the controller 801 may display an image 4302 corresponding to the detected road guide information on the second virtual image 2202.

As illustrated in FIG. 43, when the camera 310 detects road guide information (e.g., milestones, various signs, etc.) 4301 located at a traveling road while traveling on the traveling road, the controller 801 may change an inclination of the image 4302 corresponding to the road guide information such that an image 4302 corresponding to the detected road guide information (e.g., LA (Los Angeles) direction, Washington direction, Boston direction) is vertical. For example, when a milestone image 4302 corresponding to the milestone 4301 located at a short distance is displayed on the second virtual image 2202, the control unit 801 may incline the milestone image 4302 at an angle close to +90 degrees with respect to the direction of gravity. In other words, the control unit 801 changes an inclination of the second virtual image 2202 such that the second virtual image 2202 is closer to the direction of gravity as the vehicle approaches the milestone 4301. On the contrary, the control unit 801 may change an inclination of the second virtual image 2202 to an original state (inclination of zero degrees) such that the second virtual image 2202 approaches a horizontal direction as a distance between the milestone 4301 and the vehicle increases.

In other words, the controller 801 may gradually raise up the milestone image 4302 displayed on the second virtual image 2202 as a distance between the milestone 4301 and the vehicle decreases, and gradually lay down the milestone image 4302 displayed on the second virtual image 2202 as a distance between the milestone 4301 and the vehicle increases, thereby allowing a driver to intuitively check whether a distance between the milestone 4301 and the vehicle decreases or increases.

As illustrated in FIG. 44, when the camera 310 detects road guide information (e.g., LA (Los Angeles) direction, Washington direction, Boston direction) 4301 located at a traveling road while traveling on the traveling road, the controller 801 may detect information (e.g., LA direction) from the detected road guide information, and display only an image 4401 corresponding to the related information (e.g., LA (Los Angeles) direction image) from the detected road guide information (e.g., LA (Los Angeles) direction, Washington direction, Boston direction) on the second virtual image 2202. In other words, the control unit 801 may gradually raise up a milestone image (e.g., LA (Los Angeles) direction image) 4401 displayed on the second virtual image 2202 as a distance between the milestone 4301 and the vehicle decrease, and gradually lay down the milestone image 4401 displayed on the 2202 as a distance between the milestone 4301 and the vehicle increases.

As described above, the present disclosure may change a display position, a size, a depth, a transparency (brightness), an inclination, and the like of a plurality of virtual images displayed through a windshield of the vehicle, thereby effectively implementing augmented reality.

The effects of the present invention may not be limited to those effects, and other effects which have not been mentioned may be obviously understood by those skilled in the art from the appending claims.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (e.g., transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A head-up display for a vehicle, comprising:
    a single image generator that is configured to emit (i) a first image light configured to form a first virtual image and (ii) a second image light configured to form a second virtual image; and
    a mirror unit comprising:
        a first mirror that is configured to reflect the first image light and the second image light toward a windshield of the vehicle,
        a second mirror separated from the first mirror and configured to transmit light linearly polarized in a first direction and reflect light linearly polarized in a second direction toward the first mirror, and
        a third mirror separated from the second mirror and configured to reflect the light linearly polarized in the first direction, which has transmitted through the second mirror, toward the first mirror,
    wherein an optical path for the second virtual image includes (i) a distance that the light linearly polarized in the first direction travels from the second mirror to the third mirror and (ii) a distance that the light linearly polarized in the first direction travels back from the third mirror to the second mirror, in addition to an optical path for the first virtual image.

2. The head-up display of claim 1, wherein the mirror unit further comprises:
    a first rotation portion configured to change an inclination of the first mirror; and
    a second rotation portion and a third rotation portion configured to adjust angles of the second mirror and the third mirror, respectively.

3. The head-up display of claim 1, further comprising a controller configured to control an inclination of the first mirror such that the first virtual image and the second virtual image appear connected to each other.

4. The head-up display of claim 1, further comprising a controller configured to control an inclination of the first mirror such that the first virtual image and the second virtual image appear separated from each other.

5. The head-up display of claim 1, further comprising a controller configured to change display positions of the first and second virtual images.

6. The head-up display of claim 5, wherein the controller is configured to cause the first and second virtual images to overlap with each other.

7. The head-up display of claim 1, wherein the first image light includes traveling information of the vehicle.

8. The head-up display of claim 1, wherein the second image light includes an augmented reality graphic object.

9. The head-up display of claim 1, wherein the first virtual image is displayed in a first region of the windshield, and the second virtual image is displayed in a second region of the windshield.

10. The head-up display of claim 1, wherein the image generator is configured to emit linearly-polarized light in the first direction and linearly-polarized light in the second direction orthogonal to the first direction.

11. The head-up display of claim 1, further comprising a controller configured to adjust display characteristics based on a distance between the vehicle and a preceding vehicle.

* * * * *